(12) United States Patent
Song et al.

(10) Patent No.: US 12,422,786 B2
(45) Date of Patent: Sep. 23, 2025

(54) WEARABLE ELECTRONIC DEVICE

(71) Applicant: SAMSUNG ELECTRONICS CO., LTD., Suwon-si (KR)

(72) Inventors: Donghun Song, Suwon-si (KR); Kwangsoo Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 207 days.

(21) Appl. No.: 17/883,835

(22) Filed: Aug. 9, 2022

(65) Prior Publication Data

US 2023/0040498 A1    Feb. 9, 2023

Related U.S. Application Data

(63) Continuation of application No. PCT/KR2022/008057, filed on Jun. 8, 2022.

(30) Foreign Application Priority Data

Aug. 9, 2021 (KR) .................. 10-2021-0104367
Dec. 3, 2021 (KR) .................. 10-2021-0171453

(51) Int. Cl.
    *G04G 17/08* (2006.01)
(52) U.S. Cl.
    CPC .................. *G04G 17/08* (2013.01)
(58) Field of Classification Search
    None
    See application file for complete search history.

(56) References Cited

U.S. PATENT DOCUMENTS

| | | | |
|---|---|---|---|
| 9,041,607 B2 | 5/2015 | Yokoo et al. | |
| 10,345,760 B2 | 7/2019 | Kayano | |
| 11,003,220 B2 * | 5/2021 | Tobinaga | G06F 1/1626 |
| 11,102,899 B2 * | 8/2021 | Park | G04B 39/025 |
| 2008/0081679 A1 * | 4/2008 | Kawasaki | H04M 1/18 455/575.8 |
| 2019/0227494 A1 * | 7/2019 | Zhang | G04B 45/0092 |
| 2021/0274658 A1 | 9/2021 | Park | |

FOREIGN PATENT DOCUMENTS

| | | |
|---|---|---|
| CN | 111338203 | 6/2020 |
| JP | 7-244170 | 9/1995 |
| KR | 10-2006-0059178 | 6/2006 |
| KR | 10-2017-0047771 | 5/2017 |
| KR | 10-2019-0026461 | 3/2019 |
| KR | 10-2019-0142187 | 12/2019 |
| KR | 10-2020-0087587 | 7/2020 |
| KR | 10-2020-0099292 | 8/2020 |
| KR | 10-2020-0133456 | 11/2020 |

OTHER PUBLICATIONS

Search Report dated Sep. 8, 2022 issued in International Patent Application No. PCT/KR2022/008057.
Extended Search Report dated Dec. 12, 2024 in European Patent Application No. 22855984.5.

* cited by examiner

*Primary Examiner* — Imani N Hayman
*Assistant Examiner* — Rashen E Morrison
(74) *Attorney, Agent, or Firm* — Nixon & Vanderhye, P.C.

(57) ABSTRACT

According to various embodiments, a wearable electronic device includes: a housing including a housing body, a first protrusion, and a first recess, a rim including a rim body and a second protrusion, a plate, a first adhesive portion, a second adhesive portion.

19 Claims, 30 Drawing Sheets

WEARABLE ELECTRONIC DEVICE

CROSS-REFERENCE TO RELATED APPLICATIONS

This application is a continuation of International Application No. PCT/KR2022/008057 designating the United States, filed on Jun. 8, 2022, in the Korean Intellectual Property Receiving Office and claiming priority to Korean Patent Application No. 10-2021-0104367, filed on Aug. 9, 2021 and Korean Patent Application No. 10-2021-0171453, filed on Dec. 3, 2021, in the Korean Intellectual Property Office, the disclosures of all of which are incorporated by reference herein in their entireties.

BACKGROUND

1. Field

The disclosure relates to a wearable electronic device.

2. Description of Related Art

A wearable electronic device that a user can easily carry and use is being developed. In addition to various functions (e.g., detection of biometric information), a demand for wearable electronic devices that have aesthetic sense in terms of design is increasing.

When two types of colors are implemented on at least one body of an electronic device, a line (e.g., an anodizing line) may be formed at a boundary between areas in which the colors are respectively implemented, and the design of the electronic device may be less unified. In order to remove the line formed at the boundary, an additional process in the manufacturing process may be required, which may complicate the manufacturing process of the electronic device.

SUMMARY

Embodiments of the disclosure provide a wearable electronic device that appears as a single body may be provided by increasing the unity of the design when components are combined.

According to various example embodiments, a wearable electronic device may include: a housing including a housing body, a first protrusion, and a first recess, wherein the housing body includes a first housing surface, a second housing surface opposite to the first housing surface, a third housing surface disposed between the first housing surface and the second housing surface, and a fourth housing surface opposite to the third housing surface and disposed between the first housing surface and the second housing surface, and the first protrusion protrudes from the first housing surface, and the first recess includes a first recessed surface connected to the first housing surface, a second recessed surface connected to the first housing surface and opposite to the first recessed surface, and a third recessed surface between the first recessed surface and the second recessed surface, a rim including a rim body and a second protrusion, wherein the rim body includes a first rim surface, a second rim surface opposite to the first rim surface and facing the third recessed surface, a third rim surface disposed between the first rim surface and the second rim surface and facing the first recessed surface, and a fourth rim surface opposite to the third rim surface and disposed between the first rim surface and the second rim surface and facing the second recessed surface, and the second protrusion protrudes from the second rim surface between the second rim surface and the third recessed surface, a plate disposed over the first protrusion, a first adhesive portion disposed between the plate and the first housing surface, and a second adhesive portion disposed between the third recessed surface and the second rim surface.

According to various example embodiments, a wearable electronic device may include: a housing including a housing body, a first protrusion, and a first recess, wherein the housing body includes a first housing surface, a second housing surface opposite to the first housing surface, a third housing surface disposed between the first housing surface and the second housing surface, and a fourth housing surface opposite to the third housing surface and disposed between the first housing surface and the second housing surface, and the first protrusion protrudes from the first housing surface, wherein the first protrusion is not formed in a first area of the first housing surface and is formed in a second area different from the first area of the first housing surface, and the first recess includes a first recessed surface connected to the first housing surface, a second recessed surface connected to the first housing surface and opposite to the first recessed surface, and a third recessed surface between the first recessed surface and the second recessed surface, a rim including a rim body and a second protrusion, wherein the rim body includes a first rim surface, a second rim surface opposite to the first rim surface and facing the third recessed surface, a third rim surface disposed between the first rim surface and the second rim surface and facing the first recessed surface, and a fourth rim surface opposite to the third rim surface and disposed between the first rim surface and the second rim surface and facing the second recessed surface, and the second protrusion protrudes from the second rim surface between the second rim surface and the third recessed surface, a plate disposed over the first protrusion, a first adhesive portion disposed between the plate and the first housing surface, and a second adhesive portion disposed between the third recessed surface and the second rim surface.

According to various example embodiments, a wearable electronic device may include: a housing including a housing body and a first recess, wherein the housing body includes a first housing surface, a second housing surface opposite to the first housing surface, a third housing surface disposed between the first housing surface and the second housing surface, and a fourth housing surface opposite to the third housing surface and disposed between the first housing surface and the second housing surface, and the first recess includes a first recessed surface connected to the first housing surface, a second recessed surface connected to the first housing surface and opposite to the first recessed surface, and a third recessed surface between the first recessed surface and the second recessed surface, a rim including a rim body, a first protrusion, and a second protrusion, wherein the rim body includes a first rim surface, a second rim surface opposite to the first rim surface and facing the third recessed surface, a third rim surface disposed between the first rim surface and the second rim surface and facing the first recessed surface, and a fourth rim surface opposite to the third rim surface and disposed between the first rim surface and the second rim surface and facing the second recessed surface, and the first protrusion protrudes from the third rim surface, and the second protrusion protrudes from the second rim surface between the second rim surface and the third recessed surface, a plate disposed over the first protrusion, a first adhesive portion disposed between the plate and the first housing surface, and a second adhesive portion disposed between the third recessed surface and the second rim surface.

According to various example embodiments, the design and aesthetic sense of the wearable electronic device may be improved. According to various embodiments, when components having different colors are combined, a step, a coupling force, and/or a coupling line may be reduced. The effects of the electronic device according to various embodiments are not limited to the above-mentioned effects, and other unmentioned effects can be clearly understood from the following description by one of ordinary skill in the art.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
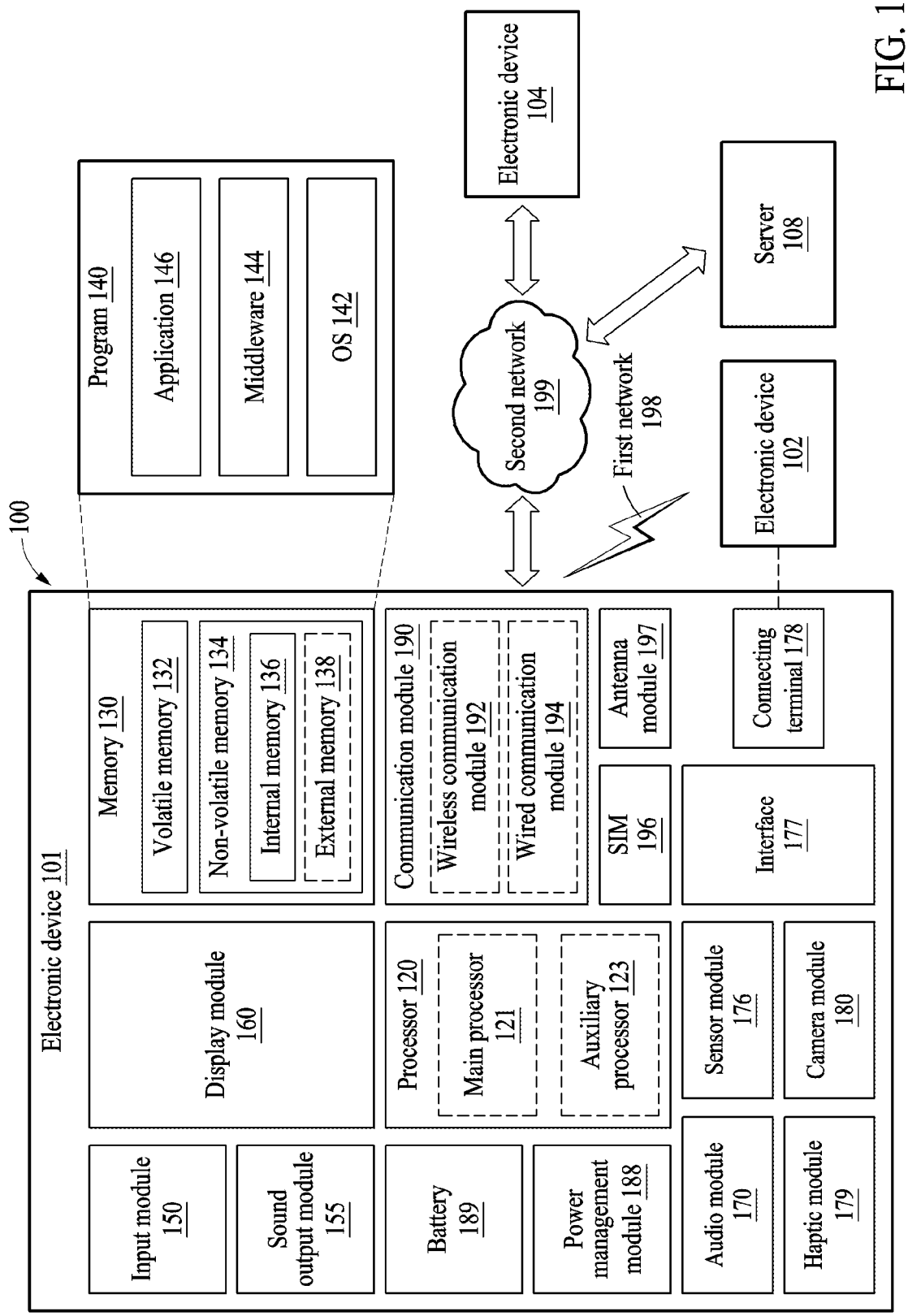
FIG. 1 is a block diagram illustrating an example electronic device in a network environment according to various embodiments.

Hereinafter, various example embodiments will be described in greater detail with reference to the accompanying drawings. When describing the embodiments with reference to the accompanying drawings, like reference numerals refer to like elements and a repeated description related thereto may not be provided.

FIG. 1 is block diagram illustrating an example electronic device in a network environment according to various embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the above components may be omitted from the electronic device 101, or one or more other components may be added in the electronic device 101. In various embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjoint with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning algorithms. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record.

The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display device 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface. The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local region network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide region network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to various embodiments, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an embodiment of the disclosure, the electronic device is not limited to those described above.

It should be appreciated that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
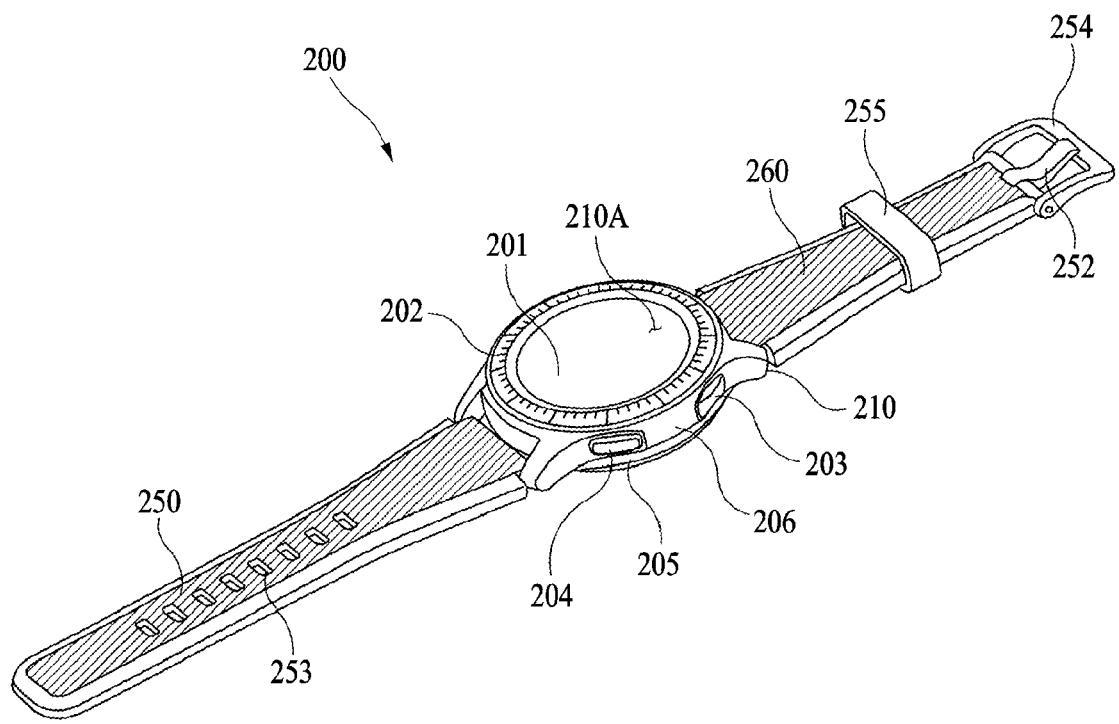
FIG. 2A is a front perspective view of a wearable electronic device according to various embodiments.
Figure 2B:
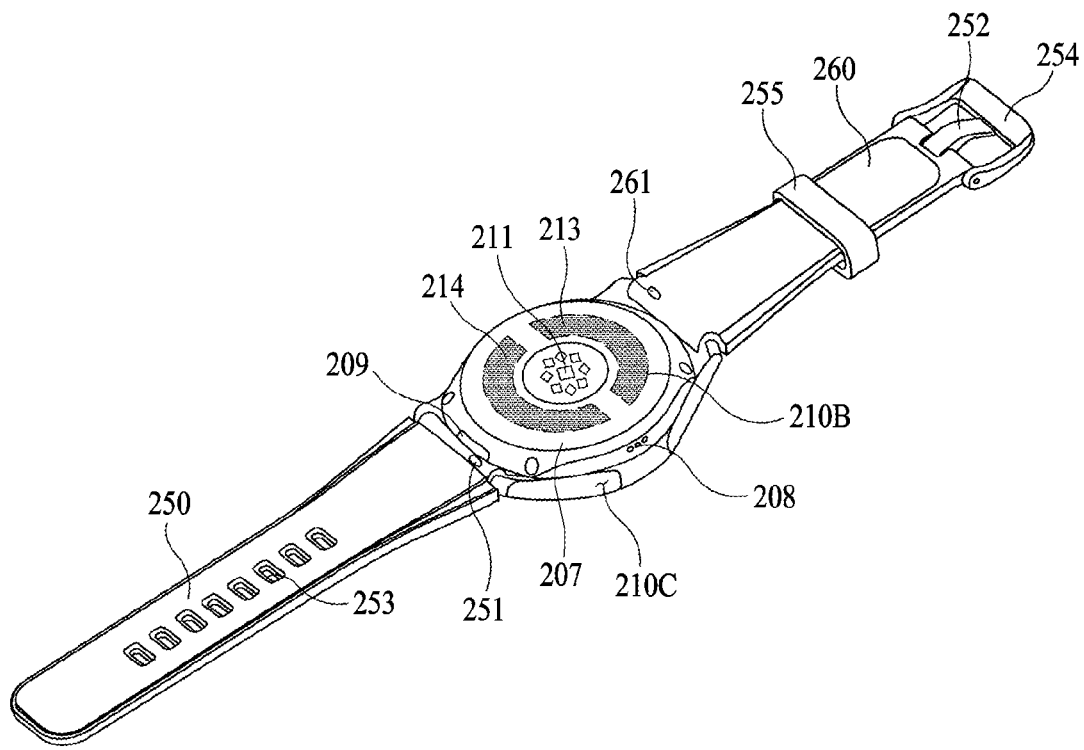
FIG. 2B is a rear perspective view of a wearable electronic device according to various embodiments.

FIGS. 2A and 2B are front and rear perspective views, respectively, illustrating an example wearable electronic device according to various embodiments. Referring to FIGS. 2A and 2B, according to an embodiment, an electronic device 200 (e.g., the electronic device 101 of FIG. 1) may include a housing 210 including a first surface (e.g., a front surface) 210A, a second surface (e.g., a rear surface) 210B, and a side surface 210C surrounding a space between the first surface 210A and the second surface 210B, and fastening members 250 and 260 connected to at least a portion of the housing 210 and configured to detachably attach the electronic device 200 to a body part (e.g., a wrist and an ankle) of a user. In an embodiment not shown, the housing may also be a structure which forms a portion of the first surface 210A, the second surface 210B, and the side surface 210C of FIGS. 2A and 2B. According to an embodiment, the first surface 210A may be formed by a front plate 201 (e.g., a glass plate or a polymer plate including various coating layers) of which at least a portion is substantially transparent. The second surface 210B may be formed by a rear plate 207 that is substantially opaque. The rear plate 207 may be formed of, for example, coated or colored glass, ceramic, polymer, metal (e.g., aluminum, stainless steel (STS), or magnesium), or a combination of at least two thereof. The side surface 210C may be coupled to the front plate 201 and the rear plate 207 and may be formed by a side bezel structure (or a "side member") 206 including a metal and/or a polymer. In an embodiment, the rear plate 207 and the side bezel structure 206 may be integrally formed and may include the same material (e.g., a metal material such as aluminum). The fastening members 250 and 260 may be formed of various materials and may have various shapes. For example, the fastening members 250 and 260 may be formed of woven fabric, leather, rubber, urethane, metal, ceramic, or a combination of at least two of the aforementioned materials and may be implemented in an integrated form or with a plurality of unit links that are movable relative to each other.

According to an embodiment, the electronic device 200 may include at least one of a display 220 (refer to FIG. 3), audio modules 205 and 208, a sensor module 211, key input devices 202, 203, and 204, and a connector hole 209. In an embodiment, the electronic device 200 may not include at least one (e.g., the key input devices 202, 203, and 204, the connector hole 209, or the sensor module 211) of the components, or additionally include other components.

The display 220 (refer to FIG. 3) may be visible through, for example, some portions of the front plate 201. The display 220 may have a shape corresponding to a shape of the front plate 201, and may have various shapes such as a circle, an oval, or a polygon. The display 220 may be coupled to or disposed adjacent to a touch sensing circuit, a pressure sensor capable of measuring an intensity (or pressure) of a touch, and/or a fingerprint sensor.

The audio modules 205 and 208 may include a microphone hole 205 and a speaker hole 208. A microphone for acquiring an external sound may be disposed in the microphone hole 205. In various embodiments, a plurality of microphones may be disposed to detect a direction of a sound. The speaker hole 208 may be used as an external speaker and a call receiver for calls. In an embodiment, the speaker hole 208 and the microphone hole 205 may be implemented as a single hole, or a speaker (e.g., a piezo speaker) may be included without the speaker hole 208.

The sensor module 211 may generate an electrical signal or a data value corresponding to an internal operating state of the electronic device 200 or an external environmental state. The sensor module 211 may include, for example, a biometric sensor module 211 (e.g., a heart rate monitor (HRM) sensor) disposed on the second surface 210B of the housing 210. The electronic device 200 may further include at least one of sensor modules (not shown), for example, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The sensor module 211 may include electrode areas 213 and 214 that form a portion of the surface of the electronic device 200 and a biosignal detection circuit (not shown) electrically connected to the electrode areas 213 and 214. For example, the electrode areas 213 and 214 may include a first electrode area 213 and a second electrode area 214 disposed on the second surface 210B of the housing 210. The sensor module 211 may be configured such that the electrode areas 213 and 214 obtain electrical signals from a part of the users body and the biosignal detection circuit detects biometric information of the user based on the electrical signals.

The key input devices 202, 203, and 204 may include a wheel key 202 disposed on the first surface 210A of the housing 210 and rotatable in at least one direction, and/or side key buttons 203 and 204 disposed on the side surface 210C of the housing 210. The wheel key 202 may have a shape corresponding to the shape of the front plate 201. In an embodiment, the electronic device 200 may not include some or all of the above-described key input devices 202, 203, 204, and the key input devices 202, 203, and 204 that are not included may be implemented in other forms such as soft keys on the display 220. The connector hole 209 may include another connector hole (not shown) that accommodates a connector (e.g., a universal serial bus (USB) connector) for transmitting and receiving power and/or data to and from an external electronic device and accommodates a connector for transmitting and receiving an audio signal to and from an external electronic device. The electronic device 200 may further include, for example, a connector cover (not shown) that covers at least a portion of the connector hole 209 and blocks infiltration of external foreign materials into the connector hole 209.

The fastening members 250 and 260 may be detachably fastened to at least a partial area of the housing 210 using locking members 251 and 261. The fastening members 250 and 260 may include one or more of a fixing member 252, a fixing member fastening hole 253, a band guide member 254, and a band fixing ring 255.

The fixing member 252 may be configured to fix the housing 210 and the fastening members 250 and 260 to a part (e.g., a wrist, an ankle, etc.) of the user's body. The fixing member fastening hole 253 may correspond to the fixing member 252 to fix the housing 210 and the fastening members 250 and 260 to the part of the user's body. The band guide member 254 may be configured to limit a range of a movement of the fixing member 252 when the fixing member 252 is fastened to the fixing member fastening hole 253, so that the fastening members 250 and 260 may be fastened to the part of the user's body in a state in which they are brought into close contact with the part of the user's body. The band fixing ring 255 may limit a range of a movement of the fastening members 250 and 260 in a state in which the fixing member 252 and the fixing member fastening hole 253 are fastened to each other.

Figure 3:
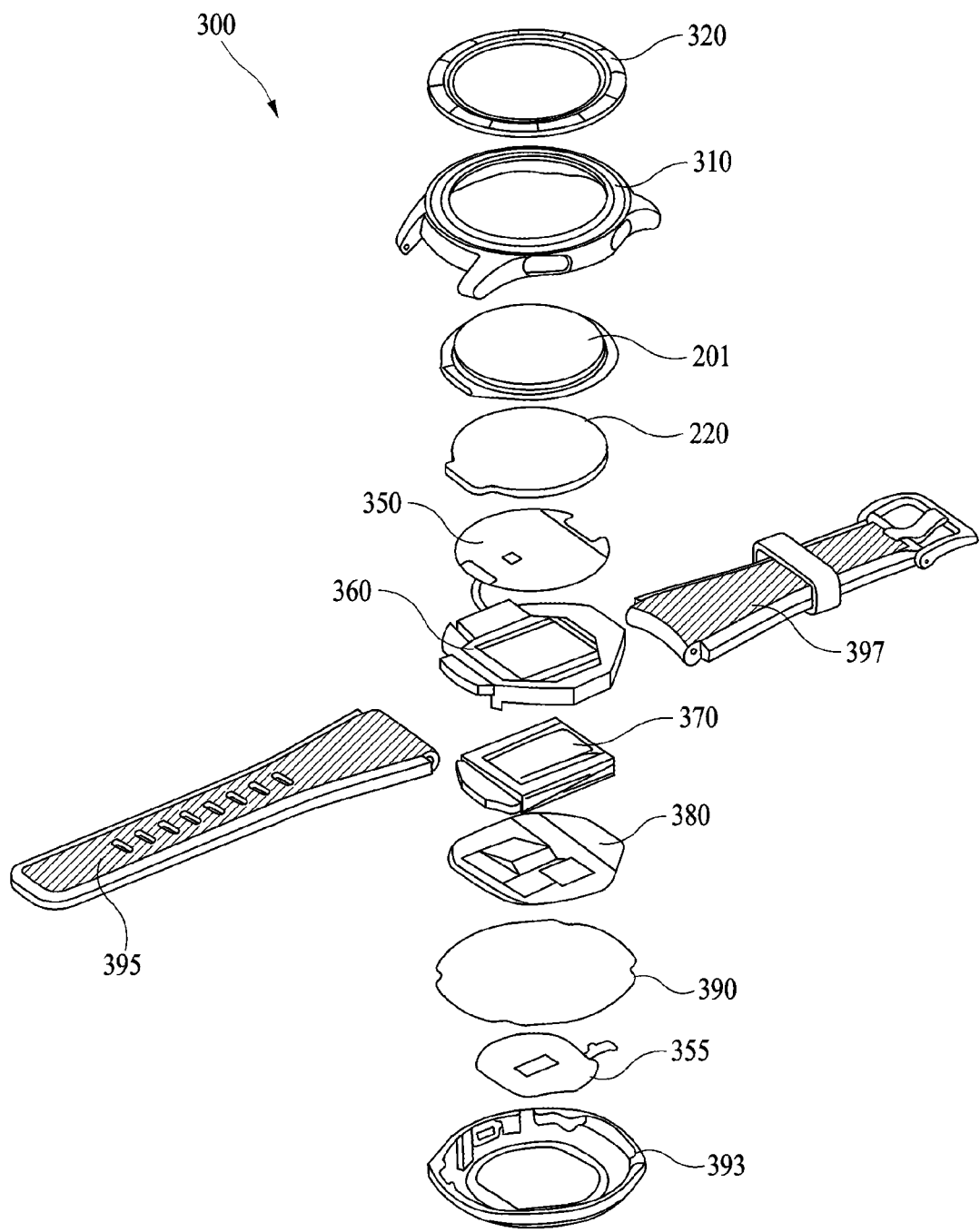
FIG. 3 is an exploded perspective view of a wearable electronic device according to various embodiments.
Figure 4A:
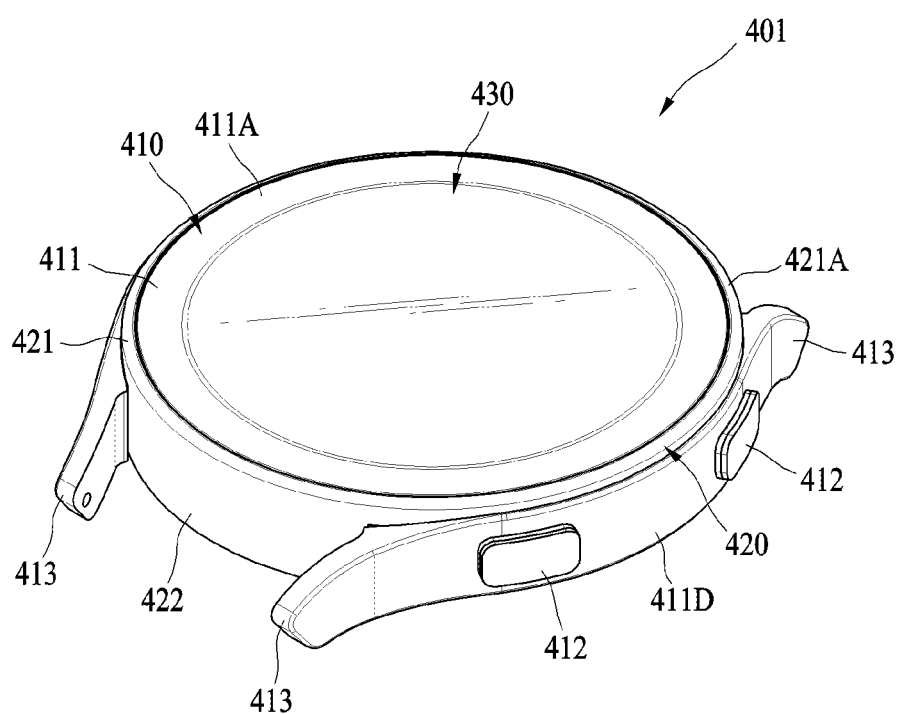
FIG. 4A is a perspective view illustrating a coupling structure of a housing and a rim member of a wearable electronic device according to various embodiments.
Figure 4B:
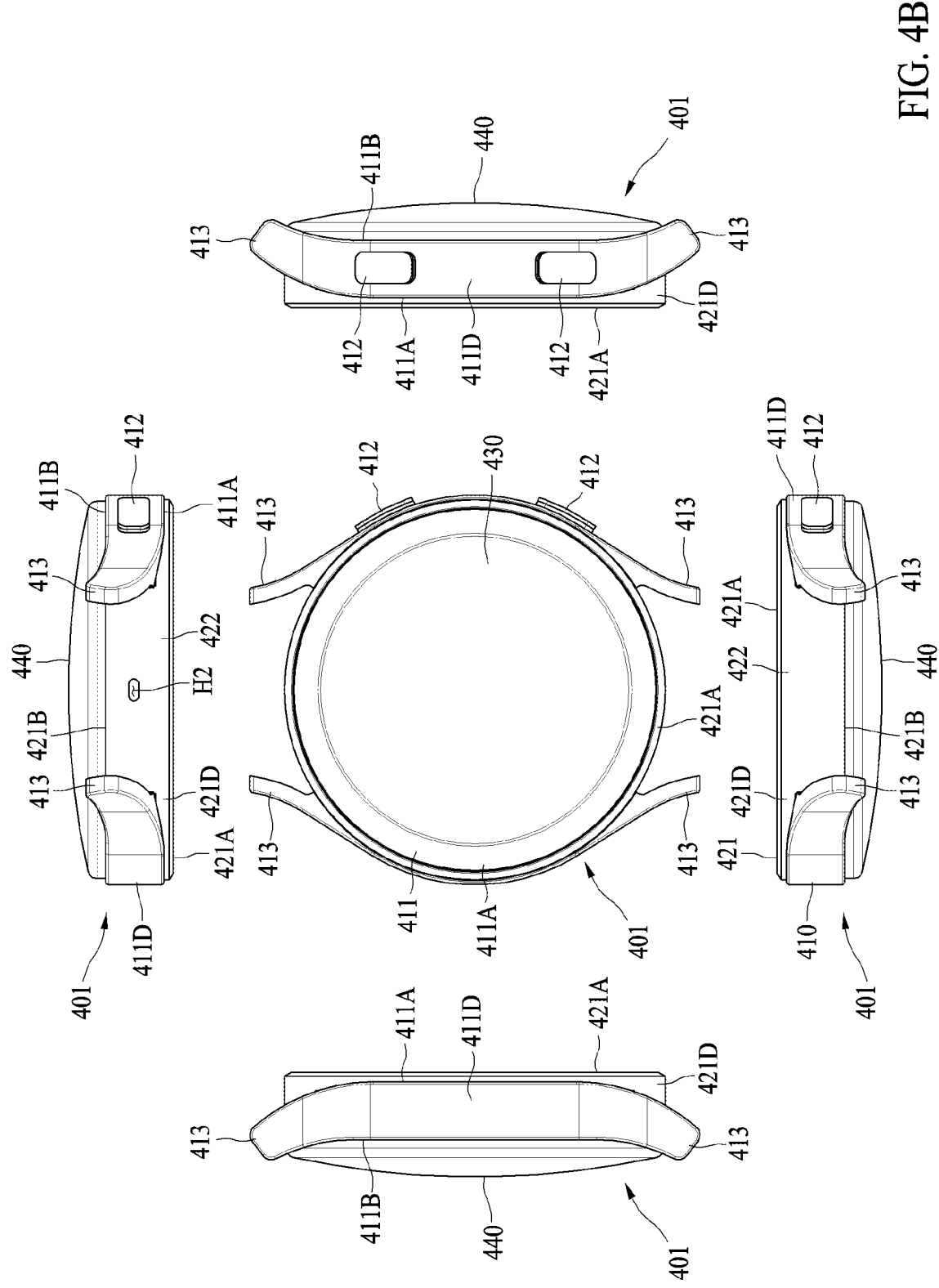
FIG. 4B is a diagram illustrating an example coupling structure of a housing and a rim member of a wearable electronic device viewed from various directions according to various embodiments.
Figure 4C:
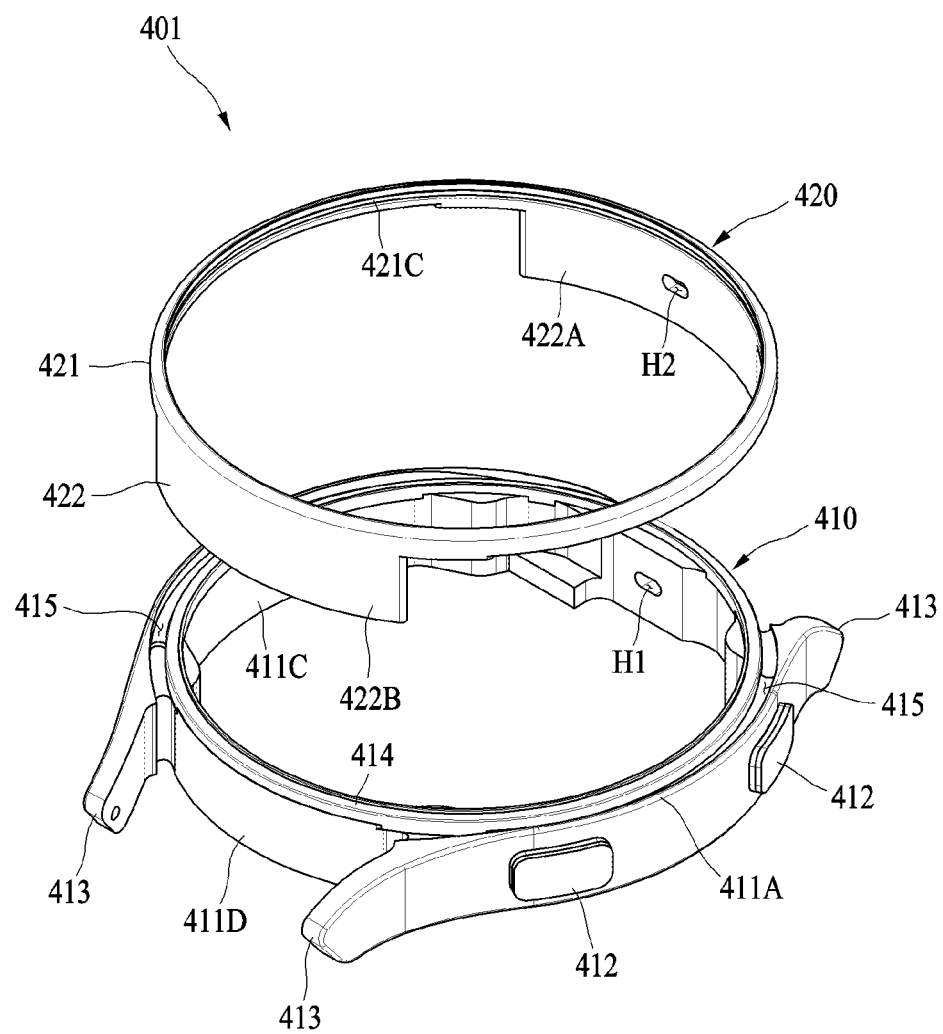
FIG. 4C is an exploded perspective view of a housing and a rim member of a wearable electronic device according to various embodiments.
Figure 4D:
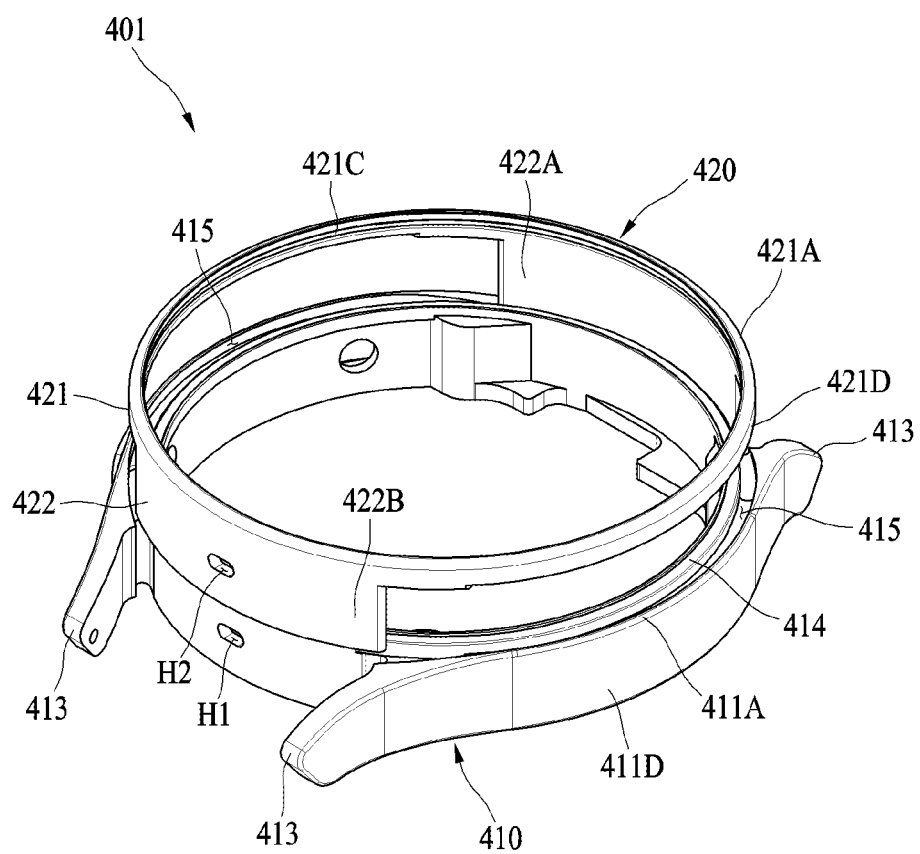
FIG. 4D is another exploded perspective view of a housing and a rim member of a wearable electronic device according to various embodiments.

FIG. 3 is an exploded perspective view of a wearable electronic device according to various embodiments. Referring to FIG. 3, an electronic device 300 (e.g., the electronic device 101 of FIG. 1 or the electronic device 200 of FIGS. 2A and 2B) may include a side bezel structure 310, a wheel key 320, a front plate 201, a display 220, a first antenna 350, a second antenna 355, a support member 360 (e.g., a bracket), a battery 370, a PCB 380, a sealing member 390, a rear plate 393, and fastening members 395 and 397. At least one of the components of the electronic device 300 may be the same as or similar to at least one of the components of the electronic device 200 of FIG. 1 or FIGS. 2A and 2B, and any repeated description thereof may not be provided hereinafter. The support member 360 may be disposed inside the electronic device 300 and may be connected to the side bezel structure 310, or may be integrally formed with the side bezel structure 310. The support member 360 may be formed of, for example, a metal material and/or a non-metal material (e.g., polymer). The display 220 may be coupled to one surface of the support member 360, and the PCB 380 may be coupled to the other surface of the support member 380. The PCB 380 may be provided with a processor, a memory, and/or an interface mounted thereon. The processor may include, for example, one or more of a CPU, a GPU, an AP, a sensor processor, or a communication processor.

The memory may include, for example, a volatile memory or a non-volatile memory. The interface may include, for example, an HDMI, a USB interface, an SD card interface, or an audio interface. For example, the interface may electrically or physically connect the electronic device 300 to an external electronic device, and may include a USB connector, an SD card/multimedia card (MMC) connector, or an audio connector.

The battery 370, which is a device for supplying power to at least one component of the electronic device 300, may include, for example, a non-rechargeable primary battery, a rechargeable secondary battery, or a fuel cell. For example, at least a portion of the battery 370 may be disposed on substantially the same plane as the PCB 380. The battery 370 may be disposed integrally inside the electronic device 300, or disposed detachably to be detachable from the electronic device 300.

The first antenna 350 may be disposed between the display 220 and the support member 360. The first antenna 350 may include, for example, a near-field communication (NFC) antenna, a wireless charging antenna, and/or a magnetic secure transmission (MST) antenna. For example, the first antenna 350 may perform short-range communication with an external device, wirelessly transmit and receive power used for charging, or transmit a magnetism-based signal including a short-range communication signal or payment data. In an embodiment, an antenna structure may be formed by a portion of the side bezel structure 310 and/or the support member 360, or a combination thereof.

The second antenna 355 may be disposed between the PCB 380 and the rear plate 393. The second antenna 355 may include, for example, an NFC antenna, a wireless charging antenna, and/or an MST antenna. For example, the second antenna 355 may perform short-range communication with an external device, wirelessly transmit and receive power used for charging, or transmit a magnetism-based signal including a short-range communication signal or payment data. In an embodiment, an antenna structure may be formed by a portion of the side bezel structure 310 and/or the rear plate 393, or a combination thereof.

The sealing member 390 may be disposed between the side bezel structure 310 and the rear plate 393. The sealing member 390 may be configured to prevent and/or reduce moisture and foreign materials from being introduced into a space surrounded by the side bezel structure 310 and the side plate 393 from the outside.

FIGS. 4A, 4B, 4C and 4D (which may be referred to as FIGS. 4A to 4D) are various views illustrating an example wearable electronic device according to various embodiments. Referring to FIGS. 4A to 4D, according to an embodiment, a wearable electronic device 401 (e.g., the electronic device 200 of FIGS. 2A and 2B and/or the electronic device 300 of FIG. 3) (hereinafter, electronic device) may include a housing 410 (e.g., the housing 210 of FIGS. 2A and 2B), a rim member 420, a first plate 430 (e.g., the front plate 201), and a second plate 440 (e.g., the rear plate 207).

The housing 410 may include a housing body 411 including a first housing surface 411A (e.g., a front surface of the housing), a second housing surface 411B (e.g., a rear surface of the housing) opposite to the first housing surface 411A, a third housing surface 411C (e.g., an inner housing surface) disposed between the first housing surface 411A and the second housing surface 411B and internally encircling between the first housing surface 411A and the second housing surface 411B, and a fourth housing surface 411D (e.g., an outer housing surface) opposite to the third housing surface 411C, disposed between the first housing surface 411A and the second housing surface 411B and externally surrounding between the first housing surface 411A and the second housing surface 411B.

The housing 410 may include at least one (e.g., two) key input device 412 (e.g., the key input devices 203 and 204 of FIG. 2A) disposed on the fourth housing surface 411D.

The housing 410 may include multiple sets (e.g., a first set and a second set) of lugs 413 connected to the fourth housing surface 411D. For example, the first set of lugs 413 may be formed in a first portion of the housing 410 to be attached to a first fastening member (e.g., the fastening member 250), and the second set of lugs 413 may be formed in a second portion (e.g., a portion opposite to the first portion) different from the first portion of the housing 410 to be attached to a second fastening member (e.g., the fastening member 260).

In an embodiment, the housing 410 may include a first hole H1 formed in the fourth housing surface 411D. For example, the first hole H1 may be formed in a substantially circular or oval shape, but is not limited in shape, and may be formed in any suitable shape. In an embodiment, the first hole H1 may be disposed between a pair of lugs 413.

In an embodiment, the housing 410 may include a protrusion 414 disposed on the first housing surface 411A. The protrusion 414 may protrude from the first housing surface 411A in one direction (e.g., in a normal direction of the first housing surface 411A). The protrusion 414 may be configured to support the first plate 430. For example, when the first plate 430 is coupled (e.g., bonded) to the housing body 411, the protrusion 414 may support the first plate 430 so that the first plate 430 may maintain a predetermined distance (e.g., a height with respect to the first housing surface 411A) with respect to the housing body 411.

In an embodiment, the housing 410 may include a recess 415 formed in the first housing surface 411A. The recess 415 may be recessed from the first housing surface 411A. The recess 415 may be configured to accommodate at least a portion of the rim member 420. For example, the recess 415 may secure a coupling (e.g., bonding) space (e.g., area) between the housing 410 and the rim member 420.

The rim member 420 may include a rim body 421 including a first rim surface 421A (e.g., a front surface of the rim), a second rim surface 421B (e.g., a rear surface of the rim) opposite to the first rim surface 421A, a third rim surface 421C (e.g., an inner rim surface) between the first rim surface 421A and the second rim surface 421B, and a fourth rim surface 421D (e.g., an outer rim surface) between the first rim surface 421A and the second rim surface 421B opposite to the third rim surface 421C.

In an embodiment, the rim member 420 may be coupled to the housing 410. For example, the rim member 420 may be coupled to the housing 410 while the second rim surface 421B, the third rim surface 421C, and the fourth rim surface 421D at least partially face the recess 415.

Figure 6A:
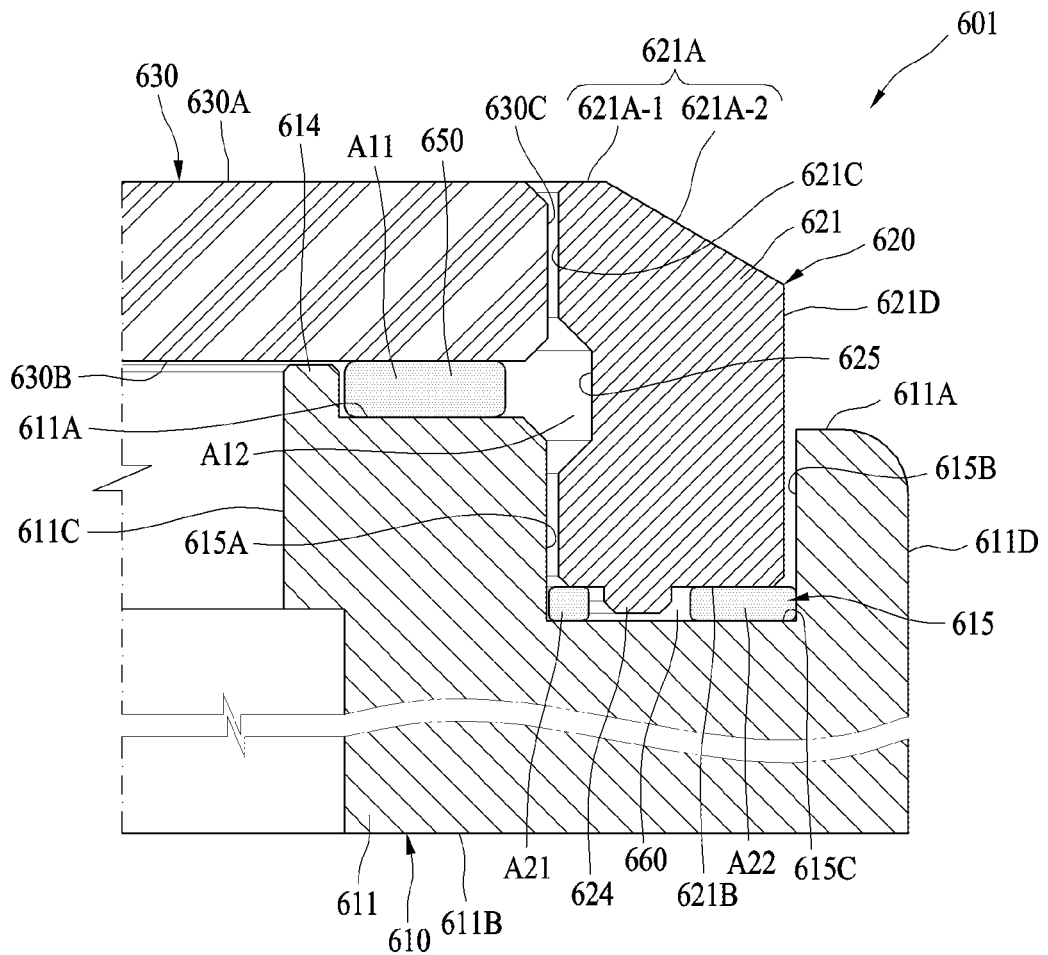
FIG. 6A is a cross-sectional view of a coupling structure of a housing and a rim member in a wearable electronic device according to various embodiments.
Figure 6B:
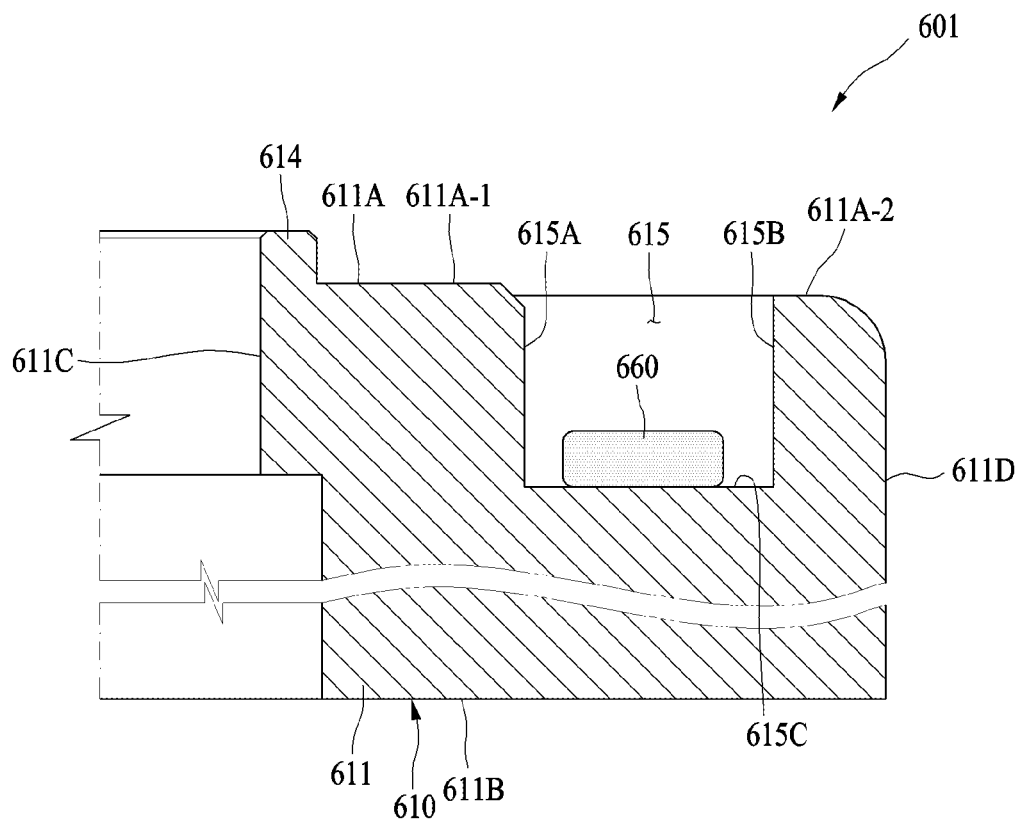
FIG. 6B is a cross-sectional view illustrating an adhesive portion formed in a housing in a wearable electronic device according to various embodiments.
Figure 6C:
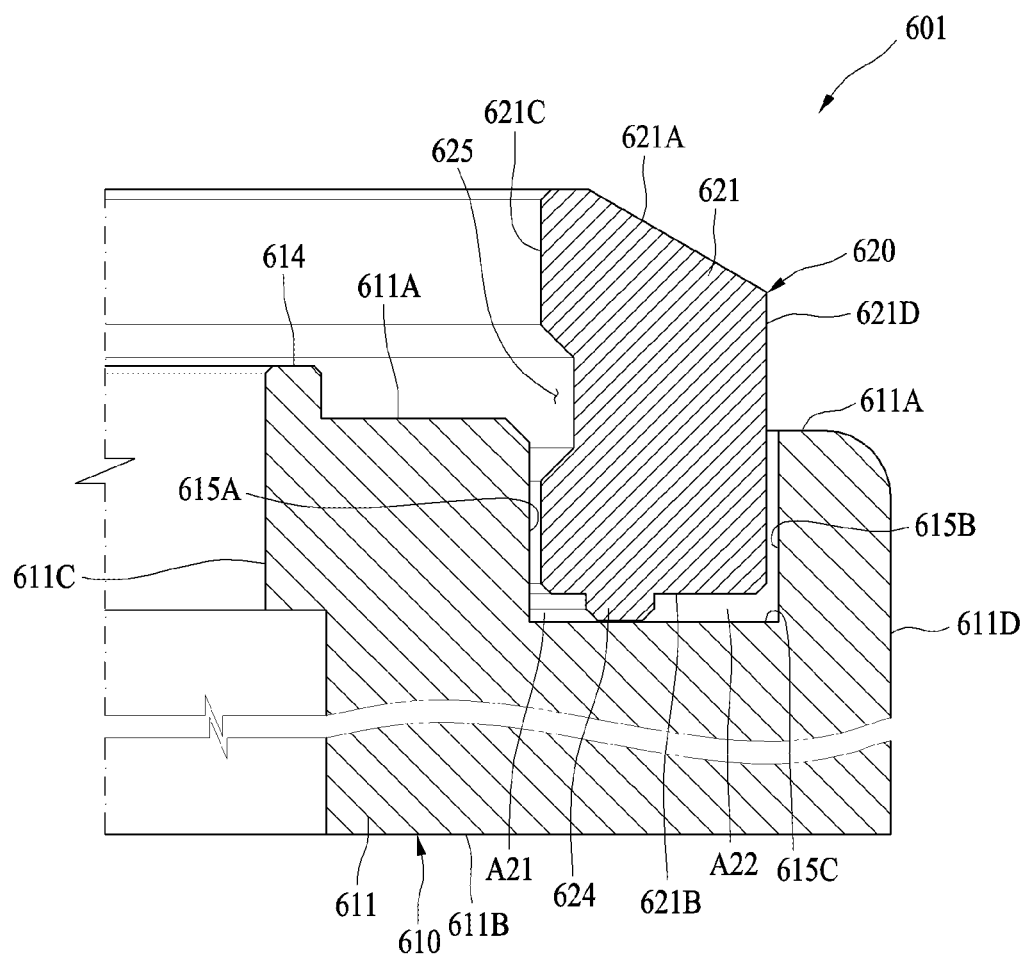
FIG. 6C is a cross-sectional view illustrating a rim member coupled to a housing in which an adhesive portion is formed in a wearable electronic device according to various embodiments.
Figure 6D:
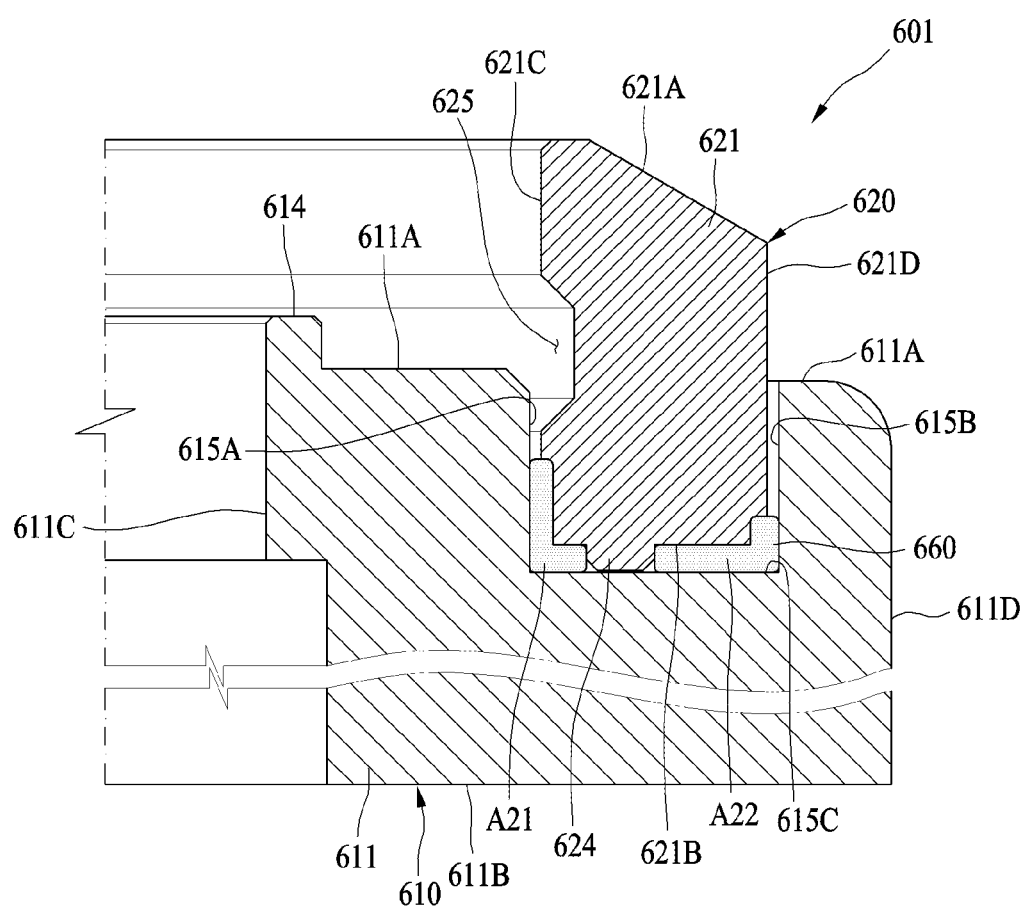
FIG. 6D is a cross-sectional view illustrating adhesive areas of an adhesive portion at a portion where a housing and a rim member are coupled in a wearable electronic device according to various embodiments.
Figure 6E:
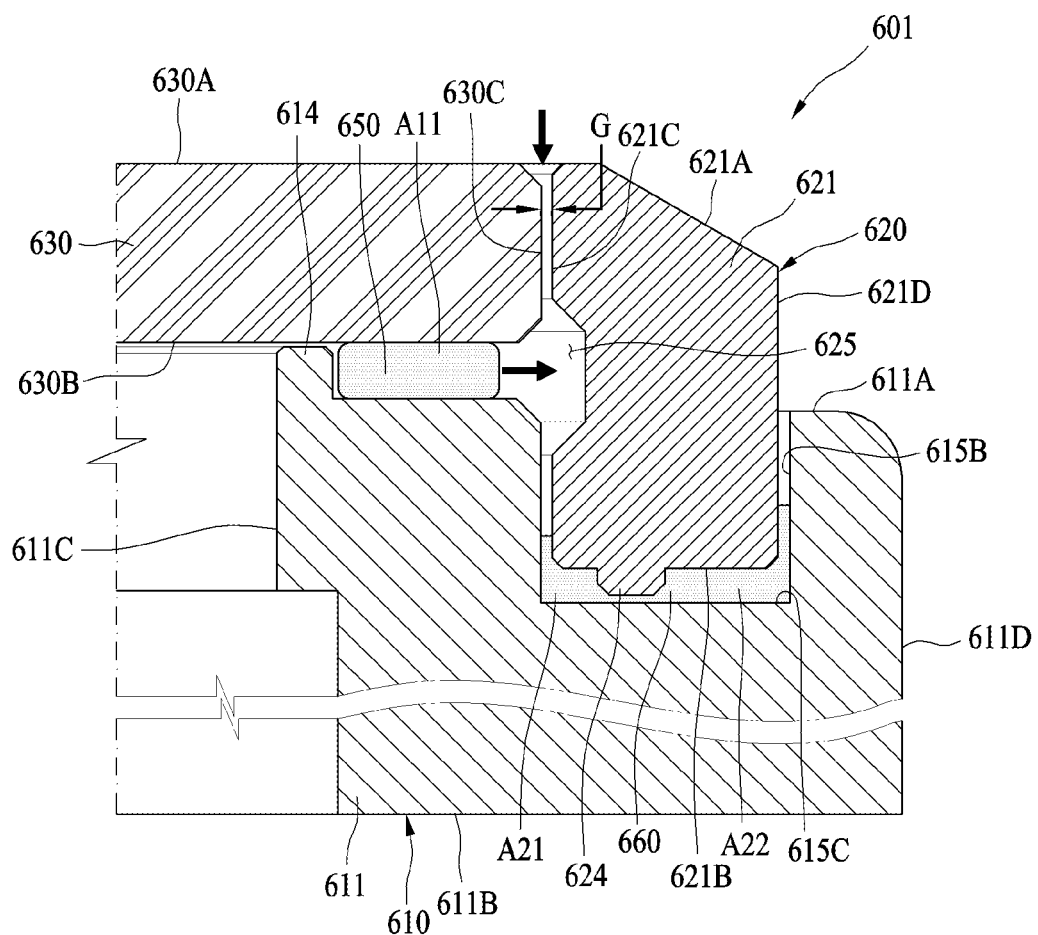
FIG. 6E is a cross-sectional view illustrating an adhesive portion being formed and a plate being coupled to another portion of a housing in a wearable electronic device according to various embodiments.
Figure 6F:
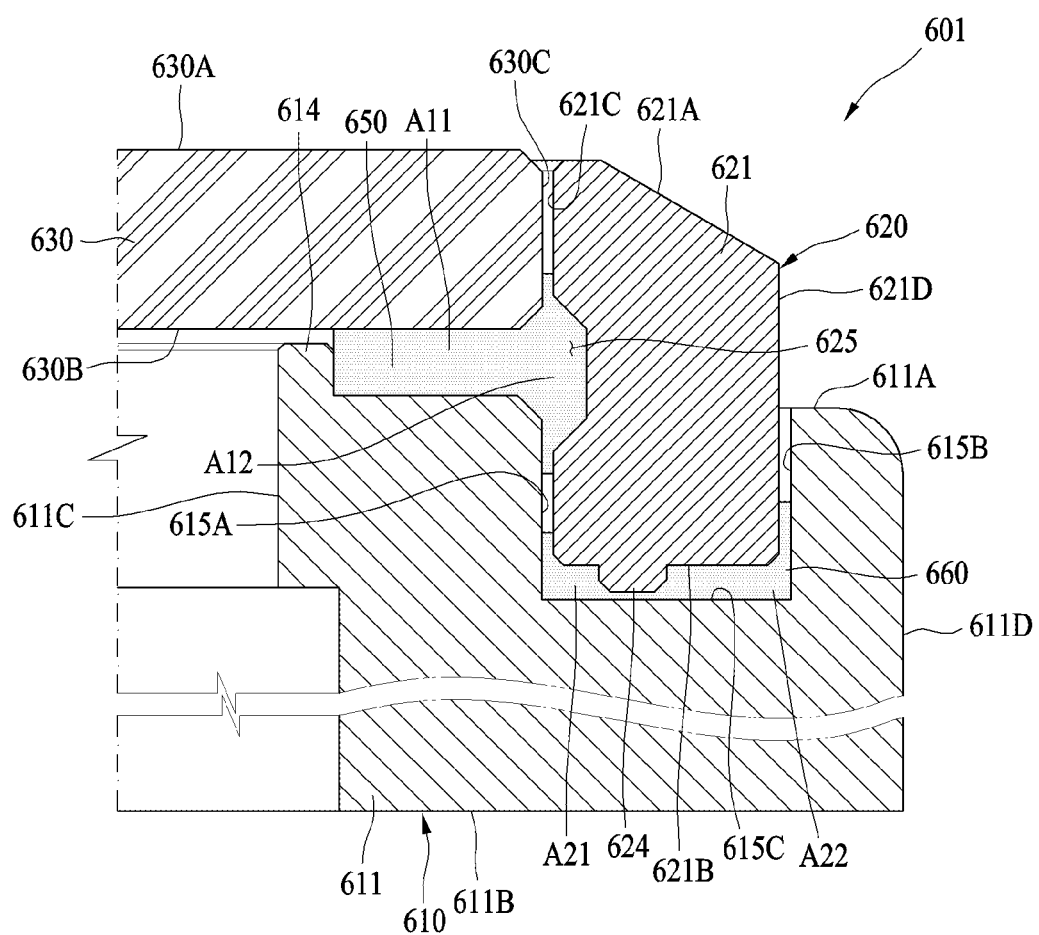
FIG. 6F is a cross-sectional view illustrating an adhesive portion formed between a housing, a rim member, and a plate in a wearable electronic device according to various embodiments.

In an embodiment, the rim member 420 may be coupled to the housing 410 so that the electronic device 401 may appear substantially as a single body when viewed from one surface (e.g., the front surface). For example, when the rim member 420 and the housing 410 are coupled, one surface (e.g., an upper surface) of the first plate 430 and a portion of the first rim surface 421A of the rim member 420 (e.g., a first rim area 621A-1 of FIG. 6A) may be on substantially the same plane.

In an embodiment, the housing 410 may at least partially have a first color, and the rim member 420 may at least partially have a second color different from the first color. In an embodiment, the housing 410 and the rim member 420 may have substantially the same color. In an embodiment, the sheen of the housing 410 and the sheen of the rim member 420 may be substantially the same as or different from each other.

In an embodiment, the rim member 420 may include a cover portion 422 connected to the rim body 421. The cover portion 422 may be disposed on the fourth housing surface 411D, for example, when the housing 410 and the rim member 420 are coupled to each other. In various embodiments, the cover portion 422 may be disposed between a pair of lugs 413.

In an embodiment, the cover portion 422 may include a first cover surface 422A (e.g., an inner cover surface) and a second cover surface 422B (e.g., an outer cover surface) opposite to the first cover surface 422A. For example, when the housing 410 and the rim member 420 are coupled to each other, the first cover surface 422A may at least partially face the fourth housing surface 411D.

In an embodiment, the cover portion 422 may extend from the rim body 421. The cover portion 422 may extend in one direction (e.g., a downward direction) from the second rim surface 421B. In various embodiments, the first cover surface 422A may be seamlessly connected to the third rim surface 421C, and the second cover surface 422B may be seamlessly connected to the fourth rim surface 421D.

In an embodiment, the cover portion 422 may include a first cover surface 422A, a second cover surface 422B, and/or a second hole H2 formed between the first cover surface 422A and the second cover surface 422B. For example, the second hole H2 may be formed in a substantially circular or oval shape, but is not limited in share, and may be formed in any suitable shape. The second hole H2 may be substantially aligned with the first hole H1, when the housing 410 and the rim member 420 are coupled.

Figure 5A:
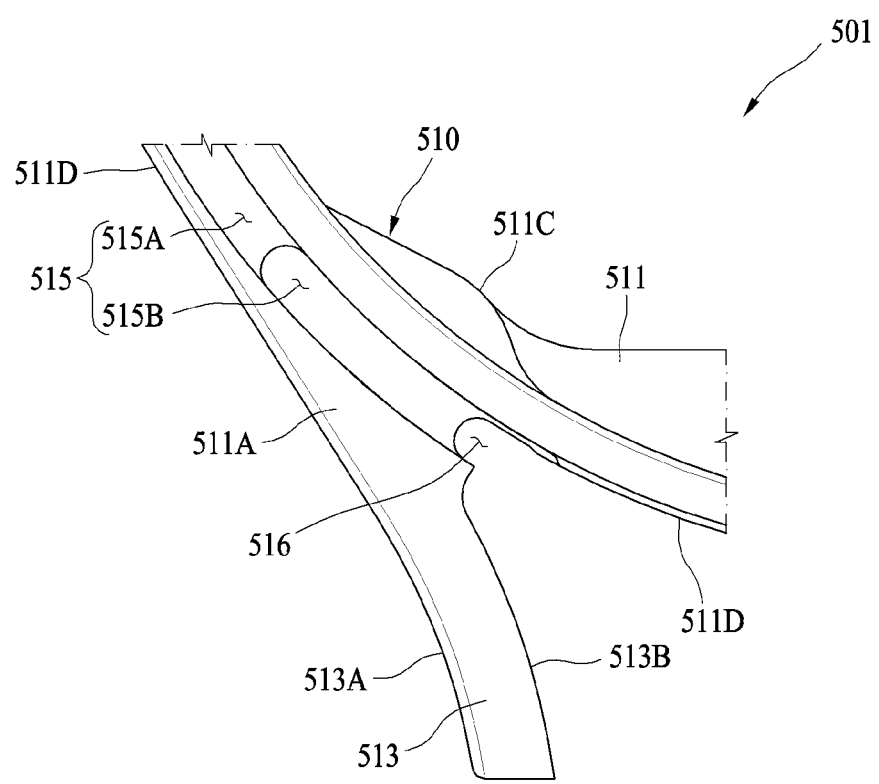
FIG. 5A is a diagram illustrating a portion of a structure of a housing to which a rim member is coupled in a wearable electronic device according to various embodiments.
Figure 5B:
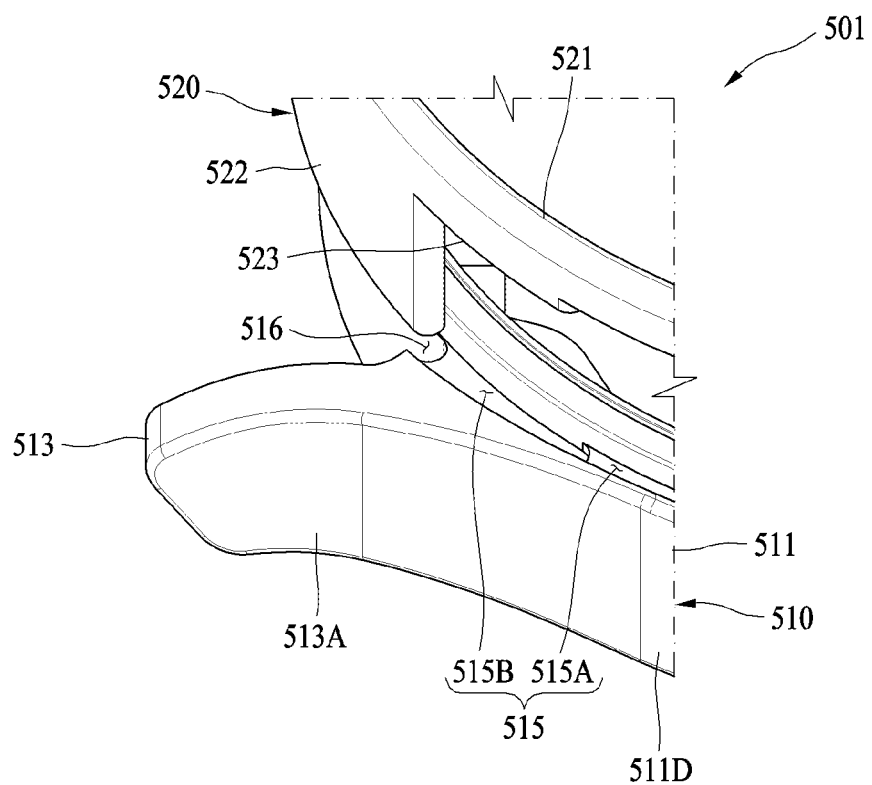
FIG. 5B is a partial perspective view illustrating a coupling scheme of a housing and a rim member in a wearable electronic device according to various embodiments.
Figure 5C:
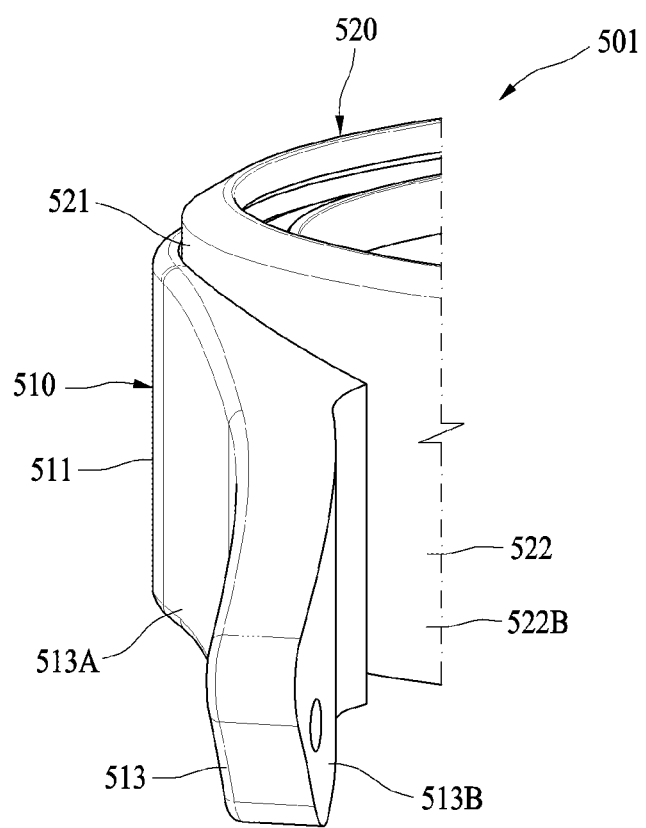
FIG. 5C is a partial perspective view illustrating a portion of a coupling structure of a housing and a rim member in a wearable electronic device according to various embodiments.

FIGS. 5A, 5B and 5C (which may be referred to as FIGS. 5A to 5C) are diagrams, including various partial perspective views, illustrating a wearable electronic device according to various embodiments. Referring to FIGS. 5A to 5C, according to an embodiment, an electronic device 501 (e.g., the wearable electronic device 401 of FIGS. 4A to 4D) may include a housing 510 (e.g., the housing 410) and a rim member 520 (e.g., the rim member 420).

The housing 510 may include a housing body 511 (e.g., the housing body 411), a plurality of lugs 513 (e.g., the lugs 413), and a recess 515 (e.g., the recess 415). The housing body 511 may include a first housing surface 511A (e.g., the first housing surface 411A), a second housing surface (not shown) (e.g., the second housing surface 411B), a third housing surface 511C (e.g., the third housing surface 411C), and a fourth housing surface 511D (e.g., the fourth housing surface 411D).

The rim member 520 may include a first rim body 521 (e.g., the rim body 421) and a cover portion 522 (e.g., the cover portion 422). The cover portion 522 may include a first cover surface (not shown) (e.g., the first cover surface 422A) and a second cover surface 522B (e.g., the second cover surface 422B).

In an embodiment, the plurality of lugs 513 may include a first lug surface 513A (e.g., an outer lug surface) connected to the fourth housing surface 511D, and a second lug surface 513B (e.g., an inner lug surface) opposite to the first lug surface 513A. The second lug surface 513B may be formed between the first lug surface 513A and the fourth housing surface 511D. In an embodiment, the first lug surface 513A and the second lug surface 513B may be integrally formed substantially seamlessly. In an embodiment, the first lug surface 513A and the fourth housing surface 511D may be integrally formed substantially seamlessly. In an embodiment, the second lug surface 513B may be formed separately and be separated from the fourth housing surface 511D by another component (e.g., a groove 516). In an embodiment, the second lug surface 513B and the fourth housing surface 511D may be integrally formed substantially seamlessly.

In an embodiment, the recess 515 may include a first recessed portion 515A having a first depth, and a second recessed portion 515B having a second depth different from the first depth. The first recessed portion 515A and the second recessed portion 515B may form a step therebetween. In an embodiment, the first recessed portion 515A and the second recessed portion 515B may be formed at least partially along a perimeter of the housing body 511. For example, the first recessed portion 515A may be formed in an inner portion of the perimeter of the housing body 511, and the second recessed portion 515B may be formed from the first recessed portion 515A to the rest of the perimeter of the housing body 511. The second recessed portion 515B may terminate at an end portion of the perimeter of the housing body 511. In an embodiment, the first depth of the first recessed portion 515A may be less than the second depth of the second recessed portion 515B. In an embodiment, the first depth and the second depth may be substantially the same. In an embodiment, the first depth may be greater than the second depth.

In an embodiment, the housing 510 may include a groove 516 formed between the fourth housing surface 511D and the second lug surface 513B. The groove 516 may be formed at least partially along the fourth housing surface 511D into the recess 515 (e.g., the second recessed portion 515B). The groove 516 may be coupled to the cover portion 522. When coupled to the cover portion 522 (e.g., FIG. 5C), the groove 516 may, for example, improve the unity between the housing 510 and the rim member 520 by making a coupling line between the second lug surface 513B and the second cover surface 522B substantially invisible. The groove 516 may, for example, substantially reduce or prevent relative movement (e.g., distortion) between the housing 510 and the rim member 520 when coupled to the cover portion 522.

In an embodiment, the rim member 520 may include a second rim body 523 between the first rim body 521 and the cover portion 522. The first rim body 521 and the second rim body 523 may form a step therebetween. The first rim body 521 may be coupled (e.g., bonded) to the first recessed portion 515A, and the second rim body 523 may be coupled (e.g., bonded) to the second recessed portion 515B. The step between the first rim body 521 and the second rim body 523 may be in contact with the step between the first recessed portion 515A and the second recessed portion 515B. The structure in which the steps are in contact with each other may reduce or prevent reverse movement of the rim member 520, strengthen the coupling force between the housing 510 and the rim member 520, and/or reduce or prevent the relative rotation therebetween, and improve the sense of unity of the electronic device 501 which is formed by the housing 510 and the rim member 520.

FIGS. 6A, 6B, 6C, 6D, 6E and 6F (which may be referred to as FIGS. 6A to 6F) are cross-sectional views of various example wearable electronic devices according to various embodiments. Referring to FIGS. 6A to 6F, according to an embodiment, an electronic device 601 (e.g., the electronic device 401 of FIGS. 4A to 4D) may include a housing 610 (e.g., the housing 410), a rim member 620 (e.g., the rim member 420), and a plate 630 (e.g., the plate 430).

The housing 610 may include a housing body 611 (e.g., the housing body 411), a first protrusion 614 (e.g., the protrusion 414), and a recess 615 (e.g., the recess 415).

The housing body 611 may include a first housing surface 611A (e.g., the first housing surface 411A), a second housing surface 611B (e.g., the second housing surface 411B), a third housing surface 611C (e.g., the third housing surface 411C), and a fourth housing surface 611D (e.g., the fourth housing surface 411D).

In an embodiment, the first housing surface 611A may include a first area 611A-1 (e.g., an inner area) connected to or disposed adjacent to the third housing surface 611C, with respect to the recess 615, and a second area 611A-2 (e.g., an external area) connected to the fourth housing surface 611D or disposed adjacent to the third housing surface 611C, with respect to the recess 615. The first protrusion 614 may be formed in the first area 611A-1. In an embodiment, the first area 611A-1 and the second area 611A-2 may have different heights. In various embodiments, a first height of the first area 611A-1 in relation to the recess 615 may be greater than a second height of the second area 611A-2 in relation to the recess 615. In an embodiment, the first height and the second height may be substantially the same. In an embodiment, the first height may be less than the second height.

In an embodiment, the first protrusion 614 may be disposed closer to the third housing surface 611C than to the fourth housing surface 611D on the first housing surface 611A. In various embodiments, the first protrusion 614 may have a surface that is on substantially the same plane as the third housing surface 611C. In an embodiment, the first protrusion 614 may be disposed closer to the fourth housing surface 611D than to the third housing surface 611C.

In an embodiment, the recess 615 may include a first recessed surface 615A (e.g., an inner recessed surface) connected to the first area 611A-1 of the first housing surface 611A and disposed closer to the third housing surface 611C than to the fourth housing surface 611D, a second recessed surface 615B (e.g., an outer recessed surface) facing the first recessed surface 615A, connected to the second area 611A-2 of the first housing surface 611A and disposed closer to the fourth housing surface 611D than to the third housing surface 611C, and a third recessed surface 615C (e.g., the bottom recessed surface) between the first recessed surface 615A and the second recessed surface 615B.

The rim member 620 may include a rim body 621 (e.g., the rim body 421) including a first rim surface 621A (e.g., the first rim surface 421A), a second rim surface 621B (e.g., the second rim surface 421B) at least partially facing the third recessed surface 615C, a third rim surface 621C (e.g., the third rim surface 421C), and a fourth rim surface 621D (e.g., the fourth rim surface 421D) at least partially facing the second recessed surface 615B.

In an embodiment, the first rim surface 621A may include a first rim area 621A-1 connected to the third rim surface 621C, and a second rim area 621A-2 connected to the first rim area 621A-1 and the fourth rim surface 621D. In an embodiment, the first rim area 621A-1 and the second rim area 621A-2 may be inclined to each other. For example, the first rim area 621A-1 may be parallel to or on substantially the same plane as a first plate surface 630A, and the second rim area 621A-2 may be inclined at a predetermined angle with respect to the first rim area 621A-1.

In an embodiment, the rim member 620 may include a second protrusion 624 formed on the second rim surface 621B. The second protrusion 624 may protrude from the second rim surface 621B in one direction (e.g., in a normal direction of the second rim surface 621B). The second protrusion 624 may be configured to support the rim body 621 against the third recessed surface 615C. For example, when the rim body 621 is at least partially accommodated in the recess 615 and at least partially coupled (e.g., bonded) to the recess 615, the second protrusion 624 may allow the rim body 621 to maintain a predetermined distance (e.g., a height of the rim body 621 in relation to the third recessed surface 615C) with respect to the recess 615. The second protrusion 624 may, for example, allow a coupling space (e.g., a adhesive area) to be secured between the second rim surface 621B and the third recessed surface 615C. The second protrusion 624 may divide a coupling space (e.g., a adhesive area) between the second rim surface 621B and the third rim surface 615C into a plurality of areas (e.g., a second adhesive area A21 and a third adhesive area A22).

In an embodiment, a gap of a predetermined distance (e.g., 0.03 mm) may be formed between the second protrusion 624 and the third recessed surface 615C. In an embodiment, a substantial gap may not be formed between the second protrusion 624 and the third recessed surface 615C. In an embodiment, the second protrusion 624 may be in contact with the third recessed surface 615C.

The first protrusion 614 supporting the plate 630 and the second protrusion 624 supporting the rim body 621 may allow the first plate surface 630A and the first rim surface 621A to be disposed on substantially the same plane, and even if manufacturing tolerances occur in the housing body 611, the rim body 621, and/or the plate 630, when the electronic device 601 is viewed, it may be possible to make the housing body 611, the rim body 621, and the plate 630 appear as substantially one body.

In an embodiment, the second protrusion 624 may be disposed closer to the third rim body 621C than to the fourth rim body 621D. In an embodiment, the second protrusion 624 may be disposed closer to the fourth rim body 621D than to the third rim body 621C.

In an embodiment, the rim member 620 may include a second recess 625 formed on the third rim surface 621C. The second recess 625 may face a space between the first housing surface 611A and the second plate surface 630B.

The plate 630 may include a first plate surface 630A (e.g., a front surface), a second plate surface 630B (e.g., a rear surface) opposite to the first plate surface 630A and disposed on the first protrusion 614 and the first housing surface 611A, and a third plate surface 630C (e.g., a side surface) facing the third rim surface 621C and disposed between the first plate surface 630A and the second plate surface 630B.

In an embodiment, a gap G may be formed between the third plate surface 630C and the third rim surface 621C. In an embodiment, a substantial gap G may not be formed between the third plate surface 630C and the third rim surface 621C. In an embodiment, the third plate surface 630C may be in contact with the third rim surface 621C.

In an embodiment, the electronic device 601 may include a first adhesive portion 650 configured to bond the housing body 611 and the plate 630. The first adhesive portion 650 may be disposed between the first housing surface 611A and the second plate surface 630B. The first adhesive portion 650 may include a first adhesive area A11 secured between the first housing surface 611A and the second plate surface 630B by the first protrusion 614.

In an embodiment, when the housing body 611 and the plate 630 are coupled, bonding material of the first adhesive area A11 is expanded, and the bonding material may at least partially fill the gap G between the third plate surface 630C and the third rim surface 621C. The first adhesive portion 650, for example, may reduce or prevent the inflow of substances (e.g., water and air) from the outside of the electronic device 601 to the inside (e.g., the inside of the housing body 611 surrounded by the housing body 611 and the plate 630) of the electronic device 601 through the gap G between the third plate surface 630C and the third rim surface 621C. The first protrusion 614, for example, may reduce or prevent the inflow of bonding materials of the first adhesive portion 650 into the inside (e.g., the inside of the housing body 611 surrounded by the housing body 611 and the plate 630) of the electronic device 601.

In various embodiments, when the housing body 611 and the plate 630 are coupled, the bonding material of the first adhesive area A11 is expanded, and the bonding material may at least partially fill the gap between the first recessed surface 615A and the third rim surface 621C.

In various embodiments, when the housing body 611 and the plate 630 are coupled, the bonding material of the first adhesive area A11 is expanded, and the bonding material may at least partially fill the second recess 625 formed on the third rim surface 621C to form an expanded adhesive area A12 (e.g., a fourth adhesive area A12). In a case where the amount of bonding material of the first adhesive portion 650 is excessive, the second recess 625, for example, may accommodate the bonding material and substantially reduce or prevent the bonding material from being visible on the exterior of the electronic device 601 through the gap G between the third plate surface 630C and the third rim face 621C. The bonding material may include, for example, a bond (e.g., loctite 8190R), an acrylic 2-component, silicone, and/or other bonding material. The second recess 625, for example, may increase a adhesive area of the plate 630 and/or a adhesive area of the housing body 611, and increase a bonding force between at least two components among the housing body 611, the plate 630, and the rim member 620. The second recess 625 may increase a waterproofing force through the gap G between the third plate surface 630C and the third rim surface 621C.

In an embodiment, the electronic device 601 may include a second adhesive portion 660 configured to bond the rim body 621 and the recess 615. The second adhesive portion 660 may be disposed between the second rim surface 621B and the third recessed surface 615C. In various embodiments, the second adhesive portion 660 may be disposed between the third rim surface 621C and the first recessed surface 615A and/or between the fourth rim surface 621D and the second recessed surface 615B.

In an embodiment, the second adhesive portion 660 may include a second adhesive area A21 disposed between the first recessed surface 615A and the second protrusion 624, and a third adhesive area A22 disposed between the second recessed surface 615B and the second protrusion 624. In an embodiment, a size of the second adhesive area A21 may be smaller than a size of the third adhesive area A22. For example, when the housing body 611 and the rim body 621 are coupled, it may be reduced or prevented that the bonding material of the second adhesive portion 660 from flowing through a gap between the fourth rim surface 621D and the second recessed surface 615B to the outside of the electronic device 601, and the bonding material may not be visible from the exterior of the electronic device 601.

Figure 7A:
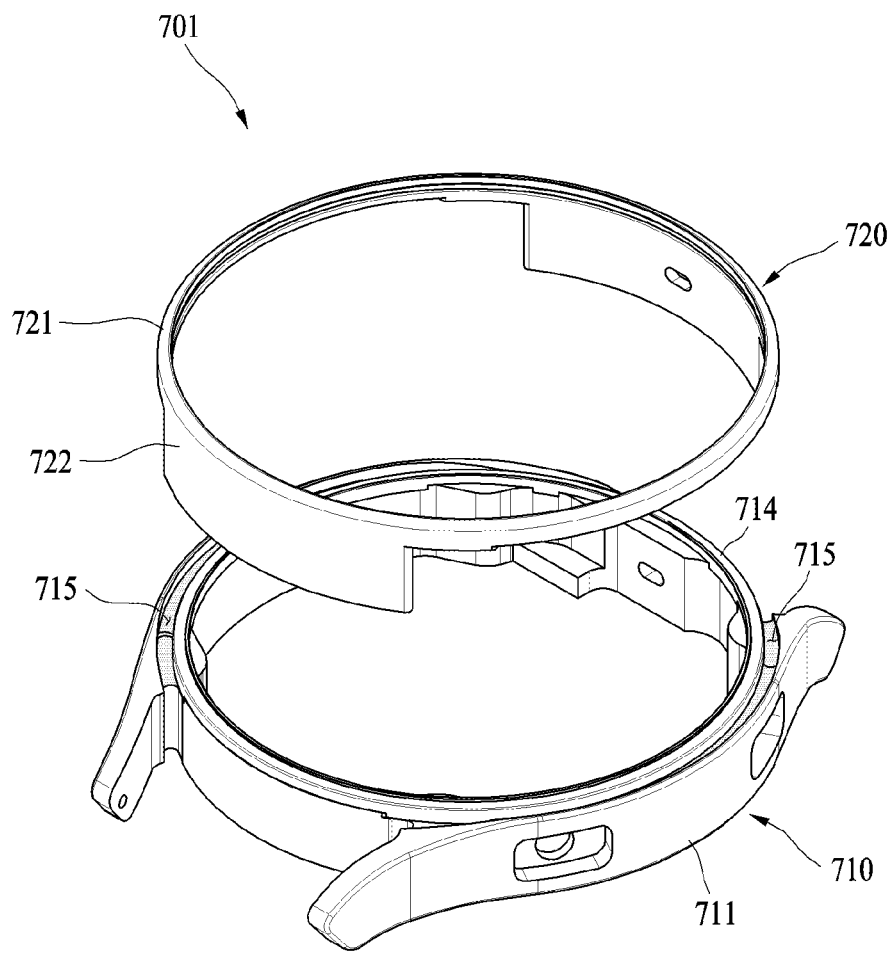
FIG. 7A is an exploded perspective view illustrating a structure of a housing and a rim member in which an adhesive area is displayed in a wearable electronic device according to various embodiments.
Figure 7B:
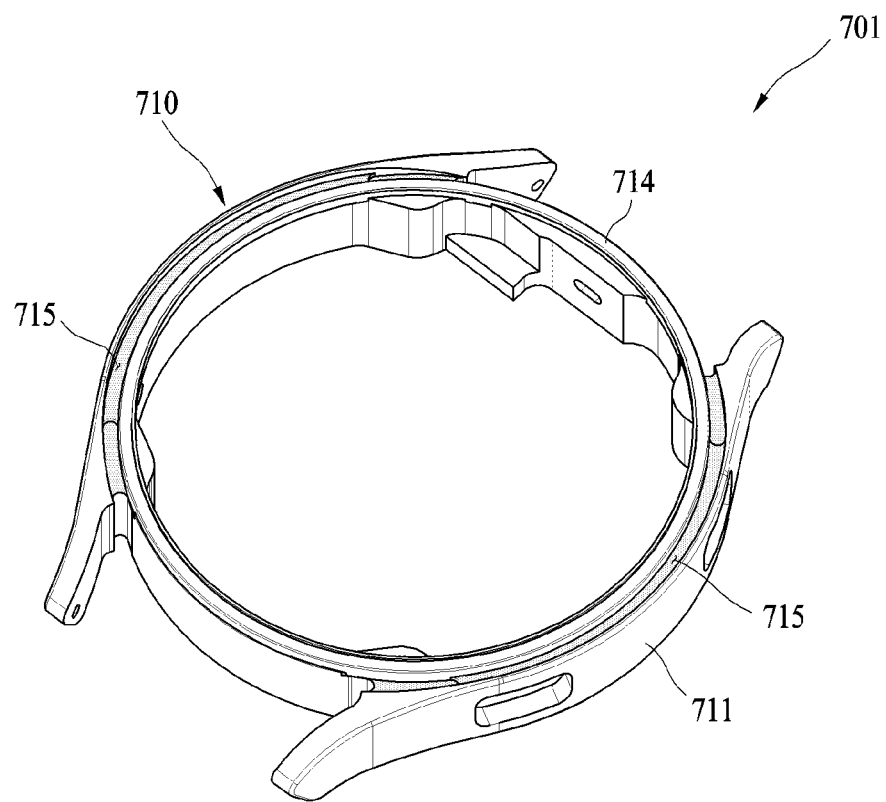
FIG. 7B is a perspective view illustrating a housing in which an adhesive area is displayed in a wearable electronic device according to various embodiments.
Figure 7C:
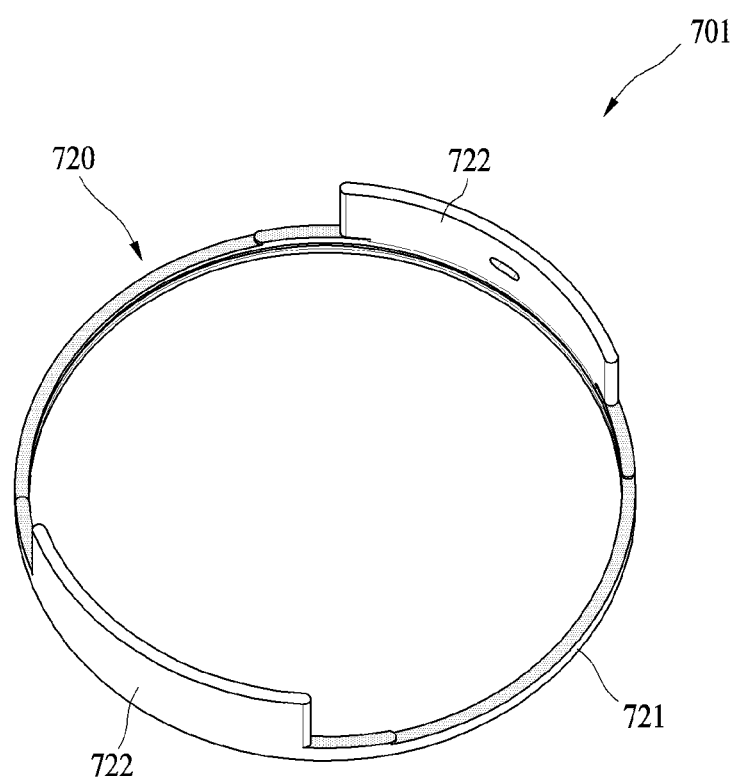
FIG. 7C is a perspective view illustrating a rim member in which an adhesive area is displayed in a wearable electronic device according to various embodiments.
Figure 7D:
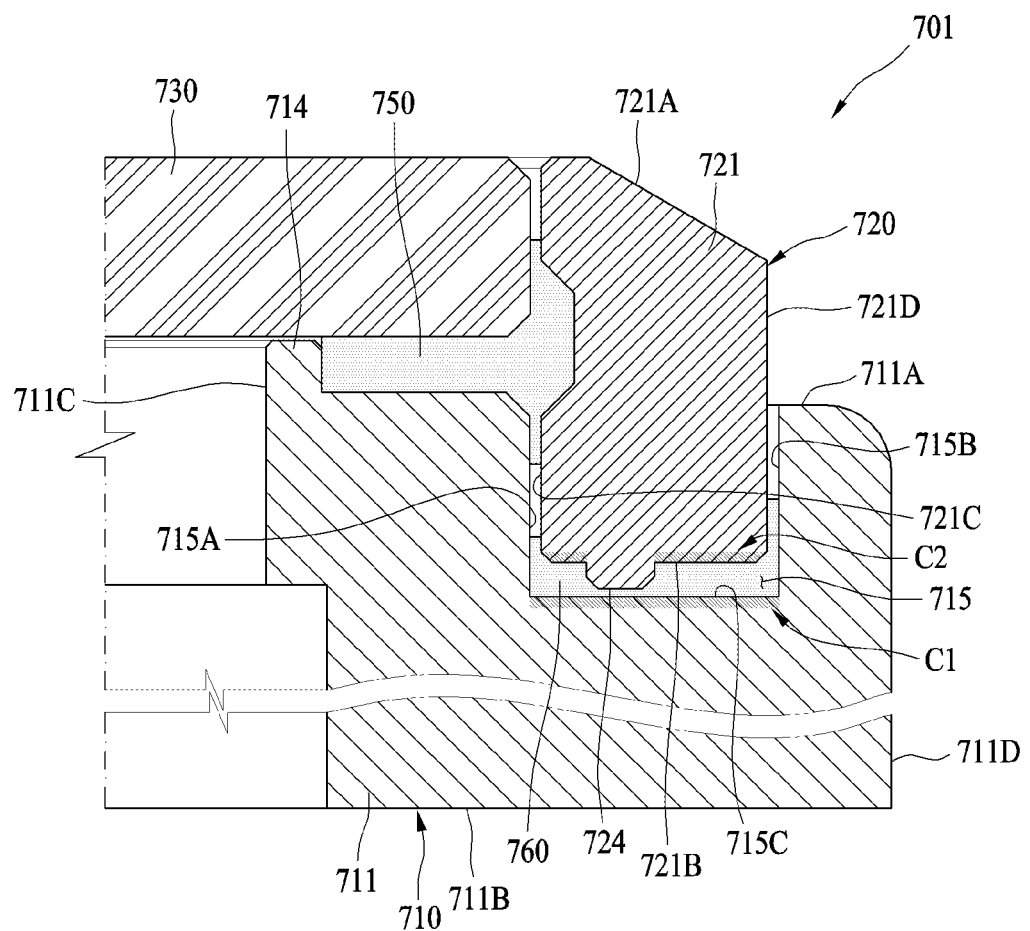
FIG. 7D is a cross-sectional view of a portion in which a housing and a rim member are coupled in a wearable electronic device according to various embodiments.

FIG. 7A is an exploded perspective view illustrating a structure of a housing and a rim member in which an adhesive area is displayed in a wearable electronic device according to various embodiments. FIG. 7B is a perspective view illustrating a housing in which an adhesive area is displayed in a wearable electronic device according to various embodiments. FIG. 7C is a perspective view illustrating a rim member in which an adhesive area is displayed in a wearable electronic device according to various embodiments. FIG. 7D is a cross-sectional view of a portion in which a housing and a rim member are coupled in a wearable electronic device according to various embodiments. Referring to FIGS. 7A, 7B, 7C and 7D (which may be referred to as FIGS. 7A to 7D), according to an embodiment, an electronic device 701 (e.g., the electronic device 601 of FIGS. 6A to 6F) may include a housing 710 (e.g., the housing 610) and a rim member 720 (e.g., the rim member 620), a plate 730 (e.g., the plate 630), a first adhesive portion 750 (e.g., the first adhesive portion 650), and a second adhesive portion 760 (e.g., the second adhesive portion 660).

The housing 710 may include a housing body 711 (e.g., the housing body 611), a first protrusion 714 (e.g., the first protrusion 614), and a first recess 715 (e.g., the first recess 615).

The housing body 711 may include a first housing surface 711A (e.g., the first housing surface 611A), a second housing surface 711B (e.g., the second housing surface 611B), a third housing surface 711C (e.g., the third housing surface 611C), and a fourth housing surface 711D (e.g., the fourth housing surface 611D).

The first recess 715 may include a first recessed surface 715A (e.g., the first recessed surface 615A), a second recessed surface 715B (e.g., the second recessed surface 615B), and a third recessed surface 715C (e.g., the third recessed surface 615C).

The rim member 720 may include a rim body 721 (e.g., the rim body 621), a cover portion 722 (e.g., the cover portion 422 of FIGS. 4A to 4D), a second protrusion 724 (e.g., the second protrusion 624), and a second recess (not shown) (e.g., the second recess 625). In an embodiment, the housing body 711 and the rim body 721 may be coupled (e.g., bonded) in one predetermined direction (e.g., a perpendicular direction in FIG. 7A).

In an embodiment, the housing body 711 may include at least one first curved portion C1 formed on the third recessed surface 715C of the first recess 715 coupled to the rim body 721. The rim body 721 may include at least one second curved portion C2 formed on the second rim surface 721B coupled to the housing body 711. The first curved portion C1 and the second curved portion C2 may, for example, increase a adhesive area and a coupling force (e.g., a bonding force) between the second rim surface 721B and the third recessed surface 715C.

In an embodiment, the first curved portion C1 and the second curved portion C2 may be formed by etching the third recessed surface 715C and the second rim surface 721B. In various embodiments, the first curved portion C1 and the second curved portion C2 may be formed by laser etching.

In various embodiments not shown, the first curved portion C1 may be formed on at least a portion of the first recessed surface 715A to which it is coupled and/or at least a portion of the second recessed surface 715B to which it is coupled. In various embodiments not shown, the second curved portion C2 may be formed on a surface of the second protrusion 724. In various embodiments not shown, the second curved portion C2 may be formed on at least a portion of the third rim surface 721C to which it is coupled and/or at least a portion of the fourth rim surface 721D to which it is coupled.

Figure 8A:
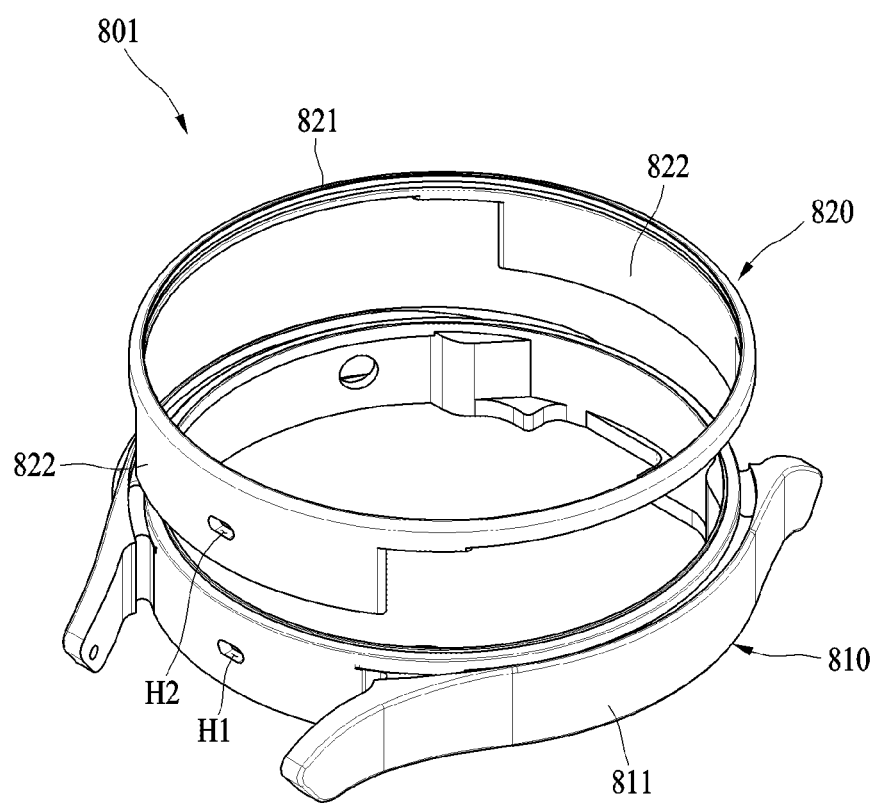
FIG. 8A is an exploded perspective view of a housing and a rim member in a wearable electronic device according to various embodiments.
Figure 8B:
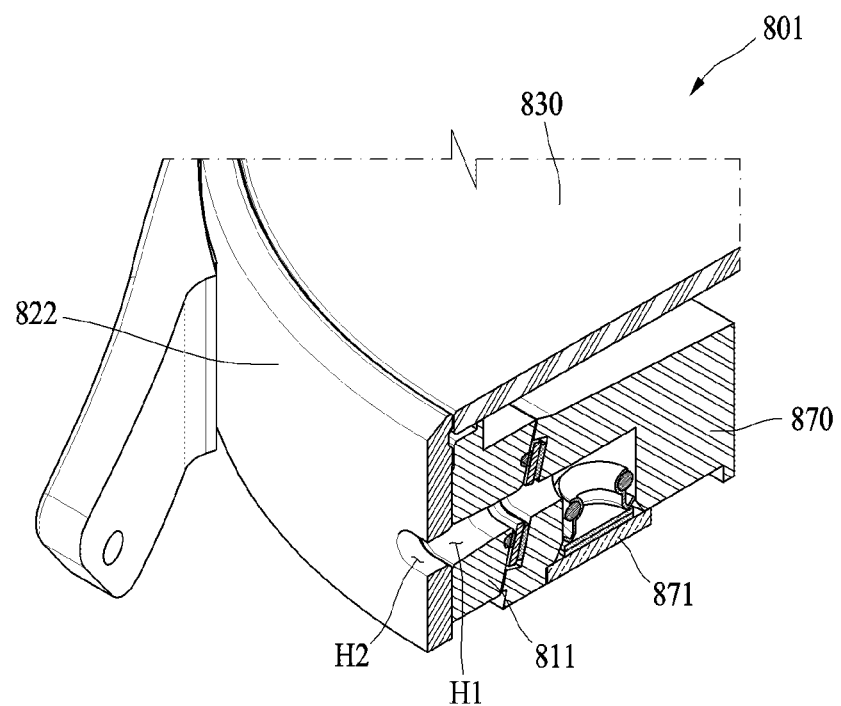
FIG. 8B is a partial sectional perspective view of a portion of a coupling structure of a housing and a rim member in a wearable electronic device according to various embodiments.
Figure 8C:
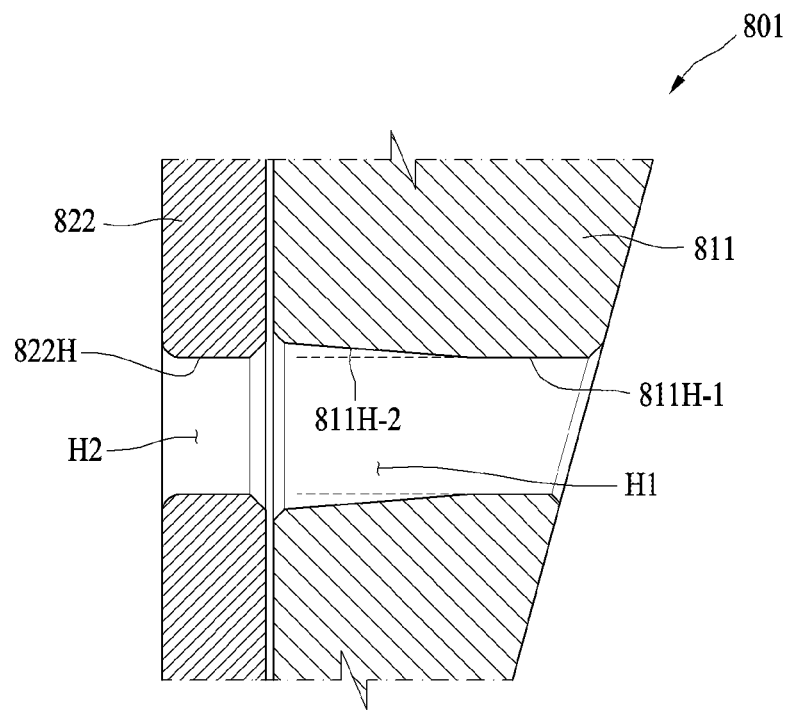
FIG. 8C is a cross-sectional view of a portion of a coupling structure of a housing and a rim member in a wearable electronic device according to various embodiments.

FIG. 8A is an exploded perspective view of a housing and a rim member in a wearable electronic device according to various embodiments. FIG. 8B is a partial sectional perspective view of a portion of a coupling structure of a housing and a rim member in a wearable electronic device according to various embodiments. FIG. 8C is a cross-sectional view of a portion of a coupling structure of a housing and a rim member in a wearable electronic device according to various embodiments. Referring to FIGS. 8A, 8B and 8C (which may be referred to as FIGS. 8A to 8C), according to an embodiment, an electronic device 801 (e.g., the electronic device 401 of FIGS. 4A to 4F) may include a housing 810 (e.g., the housing 410) including a housing body 811 (e.g., the housing body 411), a rim member 820 (e.g., the rim member 420) including a rim body 821 (e.g., the rim body 421) and a cover portion 822 (e.g., the cover portion 422), and a plate 830 (e.g., the plate 430). The housing body 811 may include a first hole H1, and the cover portion 822 may include a second hole H2 substantially aligned with the first hole H1.

In an embodiment, the electronic device 801 may include a support bracket 870 supporting the housing body 811. The support bracket 870 may be disposed inside the electronic device 801 surrounded by the housing body 811 and the plate 830. The support bracket 870 may include a pressure sensor 871 configured to sense a pressure (e.g., air pressure) of the electronic device 801 through the first hole H1 and the second hole H2, the first hole H1 and the second hole H2 being substantially aligned with each other. The pressure sensor 871 may be disposed on a flow path through the first hole H1 and the second hole H2.

In an embodiment, the first hole H1 may include a first inner side surface 811H-1, and a second inner side surface 811H-2 that is tapered to the first inner side surface 811H-1. The second hole H2 may include a third inner side surface 822H that is on substantially the same plane as the first inner side surface 811H-1. In an embodiment, the second inner side surface 811H-2 may be formed integrally with the first inner side surface 811H-1 seamlessly. The structure of the first hole H1 having the tapered second inner side surface 811H-2 may reduce or prevent diffused reflection of light through the aligned first hole H1 and the second hole H2 and exposure of the color of the housing body 811 through the first hole H1 and the second hole H2, and improve the sense of unity between the housing 810 and the rim member 820.

In an embodiment, the second inner side surface 811H-2 may be inclined at an angle of about 5 degrees with respect to the first inner side surface 811H-1, in consideration of a deviation between the first hole H1 and the second hole H2. In an embodiment, a size of a cross-section of the first hole H1 formed by the second inner side surface 811H-2 may be greater than a size of a cross-section of the first hole H1 formed by the first inner side surface 811H-1. In an embodiment, the second inner side surface 811H-2 may have a substantially linear profile. In an embodiment, the second inner side surface 811H-2 may have an at least partially curved profile.

Hereinafter, a manufacturing method of an electronic device (e.g., the electronic device of FIGS. 4A to 4D) according to an embodiment is described with reference to FIGS. 9A and 9B. The manufacturing method of the electronic device of the disclosure is an example method, and may be performed in a flow different from the flow of the operations described above. Any one operation may be omitted, and additional operations may be included. Although the manufacturing method disclosed in various embodiments of the disclosure is described as a method of manufacturing an electronic device, the manufacturing method is not limited thereto, and may also be understood as a method of combining some components. For example, the manufacturing method of the disclosure may be understood as a method of bonding a housing (e.g., the housing 410) and a rim member (e.g., the rim member 420).

Figure 9A:
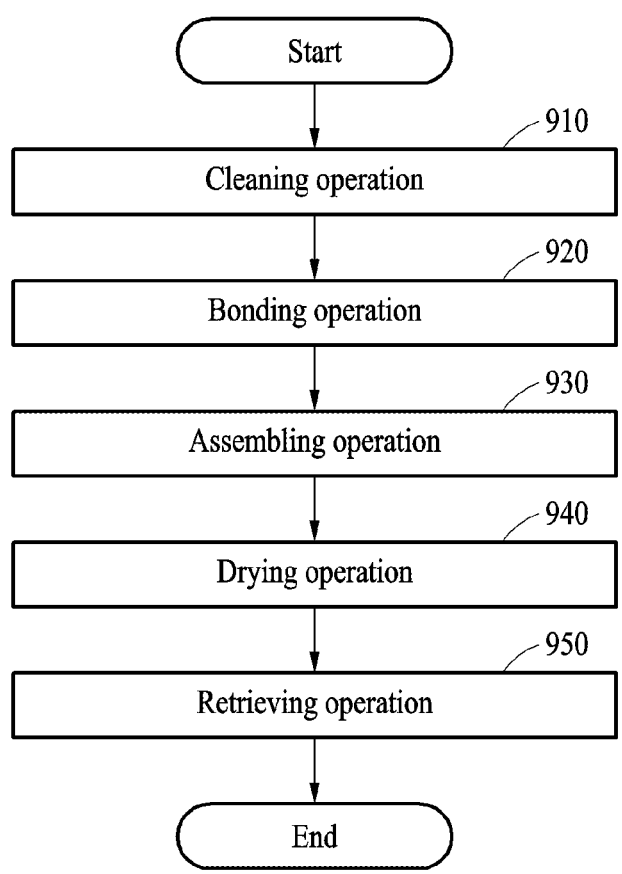
FIG. 9A is a flowchart illustrating an example method of manufacturing a wearable electronic device according to various embodiments.

FIG. 9A is a flowchart illustrating an example method of manufacturing a wearable electronic device according to various embodiments. FIG. 9B is a flowchart illustrating an example method of coupling a housing and a rim member in a wearable electronic device according to various embodiments. Referring to FIG. 9A, the manufacturing method of the electronic device may include a cleaning operation 910 for cleaning a housing (e.g., the housing 410) and a rim member (e.g., the rim member 420). In an embodiment, the housing and the rim member may be ultrasonically cleaned by an ultrasonic cleaner. For example, the ultrasonic cleaning may be performed at a pressure of about 60 Pa, an output of about 300 W, and a cycle of 300 s. In an embodiment, the cleaning operation 910 may include cleaning the housing and the rim member at different flow rates. For example, the cleaning operation 910 may include a first cleaning operation for cleaning at a first flow rate (e.g., about 80 ml/min), and a second cleaning operation for cleaning at a second flow rate (e.g., about 0.1 ml/min) different from the first flow rate. The manufacturing method of the electronic device may include a bonding operation 920 for applying a bonding material to at least a portion (e.g., the recess 415) of the housing. The amount of bonding material may be, for example, about 11 mg to about 14 mg. The manufacturing method of the electronic device may include an assembling operation 930 for assembling the rim member to the housing to which the bonding material is applied. Assembly of the housing and the rim member may be completed within about 90 seconds after the bonding material is applied to the housing. The manufacturing method of the electronic device may include a drying operation 940 for drying the electronic device to which components (e.g., the housing and the rim member) are assembled. For example, drying of the electronic device may be performed at about 80±3° C. for about 10±1 minutes. The manufacturing method of the electronic device may include a retrieving operation 950 for retrieving the electronic device when the drying operation 940 is completed. The specific conditions of the manufacturing method are not limited to the ones described above, and may vary depending on the equipment and/or method used.

Figure 9B:
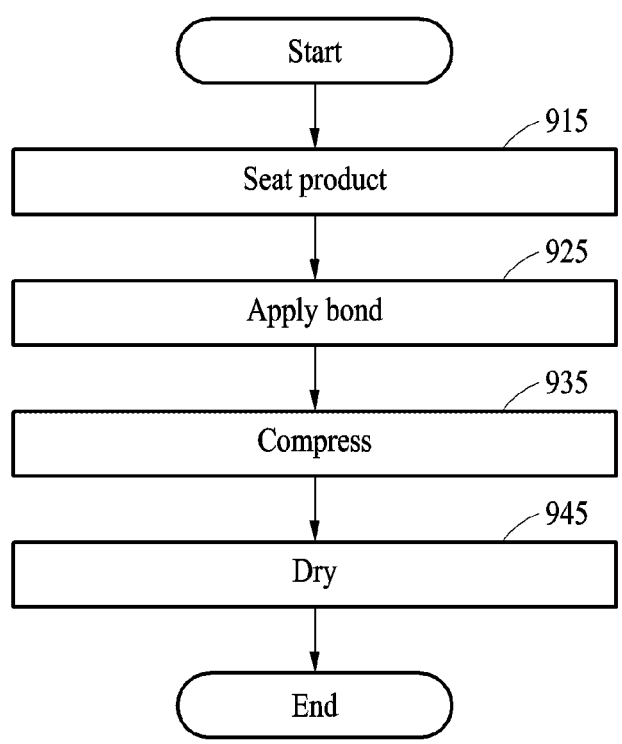
FIG. 9B is a flowchart illustrating an example method of coupling a housing and a rim member in a wearable electronic device according to various embodiments.

Referring to FIG. 9B, the manufacturing method of the electronic device may include an operation 915 for seating a first component (e.g., the housing 410 of FIGS. 4A to 4D). For example, the first component may be seated on some components (e.g., the second plate 440) of the electronic device. The manufacturing method of the electronic device may include an operation 925 for applying bond to at least a portion of the first component (e.g., the housing 410) that is seated. For example, the bond may be applied at a pressure of about 24 psi, a temperature of about 2° C. to 8° C., a time of about 18 s/pcs, and/or a rate of about 5 mm/s. For example, the bond may be applied via a tool (e.g., a needle) having a diameter of about 0.9 mm. The manufacturing method of the electronic device may include an operation 935 for compressing the second component (e.g., the rim member 420) onto the first component (e.g., the housing 410) to which the bond is applied. For example, the compression may be performed with a pressure of about 3 kg for about 30 seconds, but is not limited thereto, and compression conditions may vary depending on the equipment and/or method. The manufacturing method of the electronic device may include a drying operation 945 for drying the compressed components. For example, the drying may be performed in a heat chamber, at a temperature of about 80° C., for about 10 minutes.

Figure 10A:
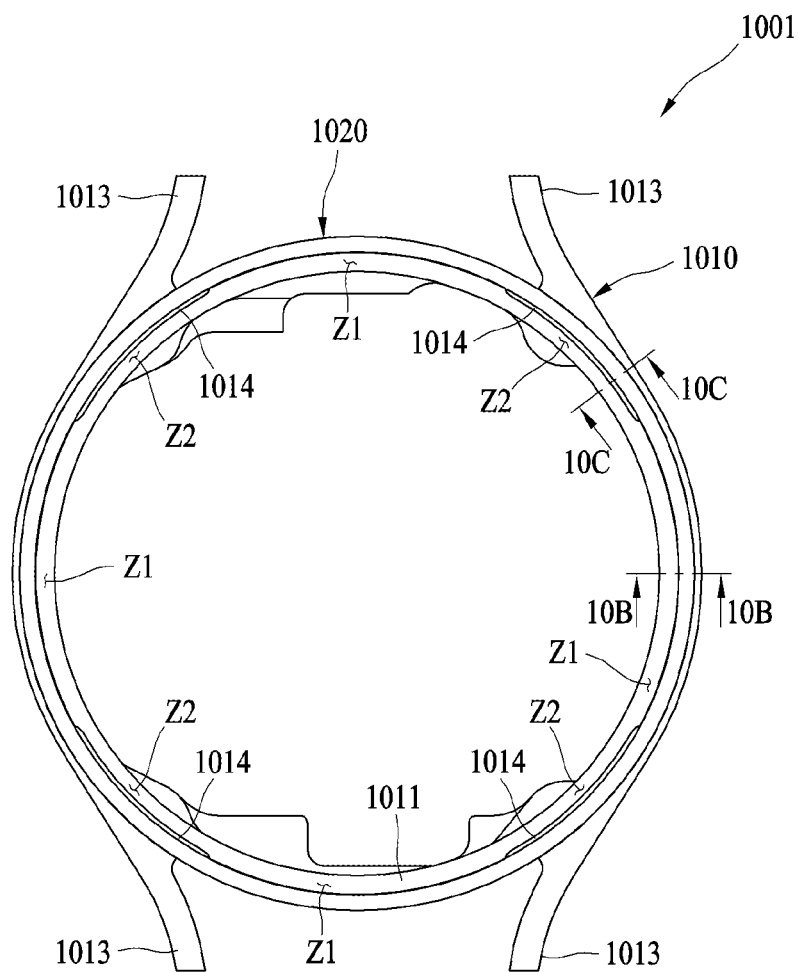
FIG. 10A is a diagram illustrating a coupling structure of a housing and a rim member in a wearable electronic device according to various embodiments.
Figure 10B:
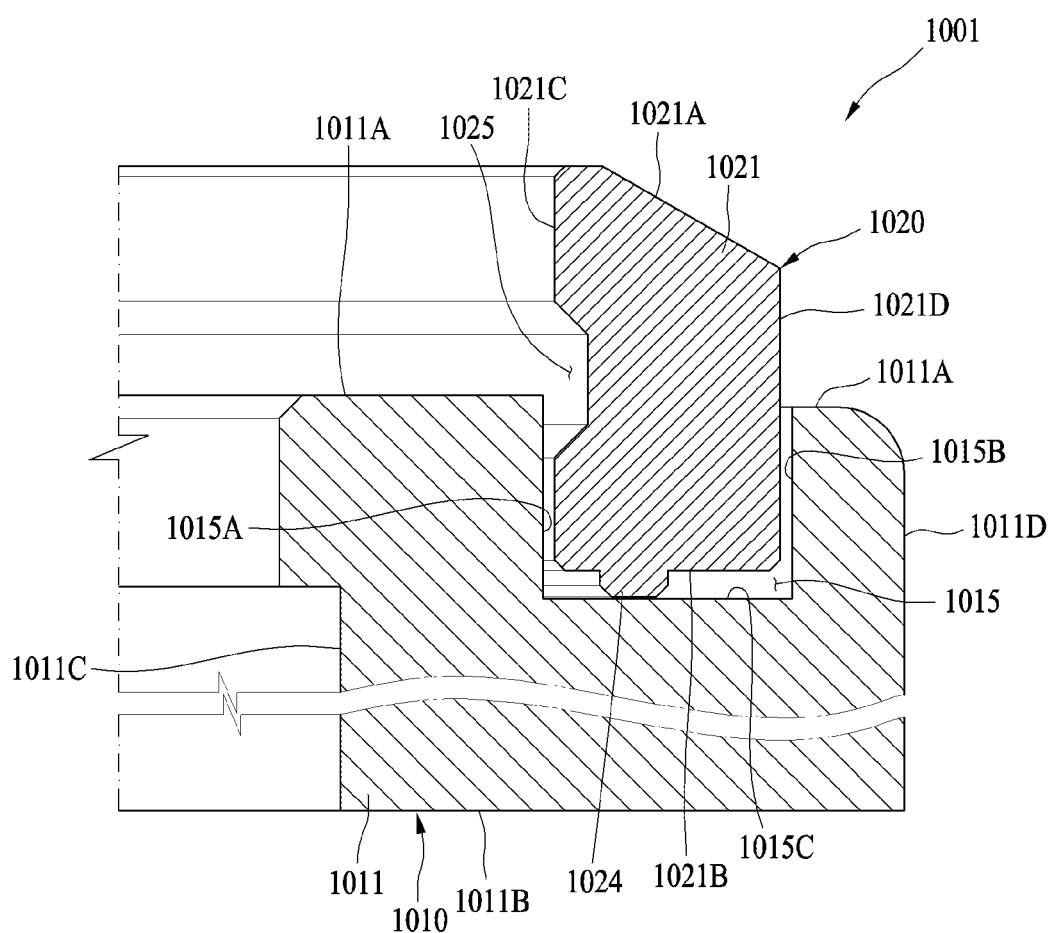
FIG. 10B is a cross-sectional view of a wearable electronic device taken along line 10B-10B of FIG. 10A according to various embodiments.
Figure 10C:
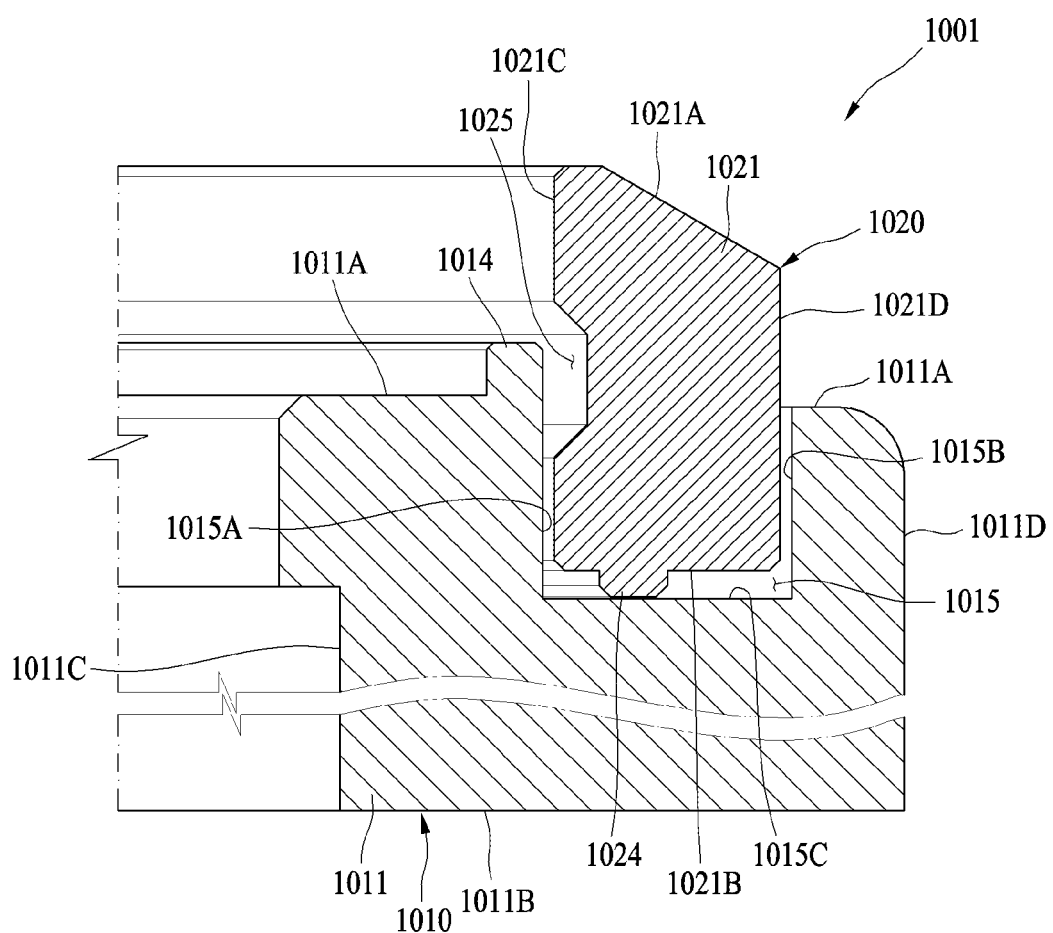
FIG. 10C is a cross-sectional view of a wearable electronic device taken along line 10C-10C of FIG. 10A according to various embodiments.

FIG. 10A is a diagram illustrating a coupling structure of a housing and a rim member in a wearable electronic device according to various embodiments. FIG. 10B is a cross-sectional view of a wearable electronic device taken along line 10B-10B of FIG. 10A according to various embodiments. FIG. 10C is a cross-sectional view of a wearable electronic device taken along line 10C-10C of FIG. 10A according to various embodiments. Referring to FIGS. 10A, 10B and 10C (which may be referred to as FIGS. 10A to 10C), according to an embodiment, an electronic device 1001 (e.g., the electronic device 601 of FIGS. 6A to 6F) may include a housing 1010 (e.g., the housing 610) and a rim member 1020 (e.g., the rim member 620).

The housing 1010 may include a housing body 1011 (e.g., the housing body 611), multiple sets of lugs 1013 (e.g., the lugs 413 of FIGS. 4A to 4F), a first protrusion 1014 (e.g., the first protrusion 614), and a first recess 1015 (e.g., the first recess 615). The housing body 1011 may include a first housing surface 1011A (e.g., the first housing surface 411A), a second housing surface 1011B (e.g., the second housing surface 411B), a third housing surface 1011C (e.g., the third housing surface 411C), and a fourth housing surface 1011D (e.g., the fourth housing surface 411D). The first recess 1015 may include a first recessed surface 1015A (e.g., the first recessed surface 615A), a second recessed surface 1015B (e.g., the second recessed surface 615B), and a third recessed surface 1015C (e.g., the third recessed surface 615C).

The rim member 1020 may include a rim body 1021 (e.g., the rim body 621), a second protrusion 1024 (e.g., the second protrusion 624), and a second recess 1025 (e.g., the second recess 625). The rim body 1021 may include a first rim surface 1021A (e.g., the first rim surface 621A), a second rim surface 1021B (e.g., the second rim surface 621B), a third rim surface 1021C (e.g., the third rim surface 621C), and a fourth rim surface 1021D (e.g., the fourth rim surface 621D).

In an embodiment, the housing 1010 may include a plurality of first protrusions 1014 spaced apart from each other and arranged on the first housing surface 1011A along the perimeter of the housing body 1011. For example, the housing body 1011 may include a first area Z1 (e.g., an upper area, lower area, left area and right area of FIG. 10A) of the first housing surface 1011A connected to the fourth housing surface 1011D in which the multiple sets of lugs 1013 are not formed, and a second area Z2 of the first housing surface 1011A connected to the fourth housing surface 1011D in which the multiple sets of lugs 1013 are formed.

In an embodiment, the first protrusion 1014 may be disposed closer to the first recessed surface 1015A and/or the third rim surface 1021C than to the third housing surface 1011C. In various embodiments, the first protrusion 1014 may have a surface that is on substantially the same plane as the first recessed surface 1015A. In various embodiments, the first protrusion 1014 may directly face the second recess 1025.

Figure 11A:
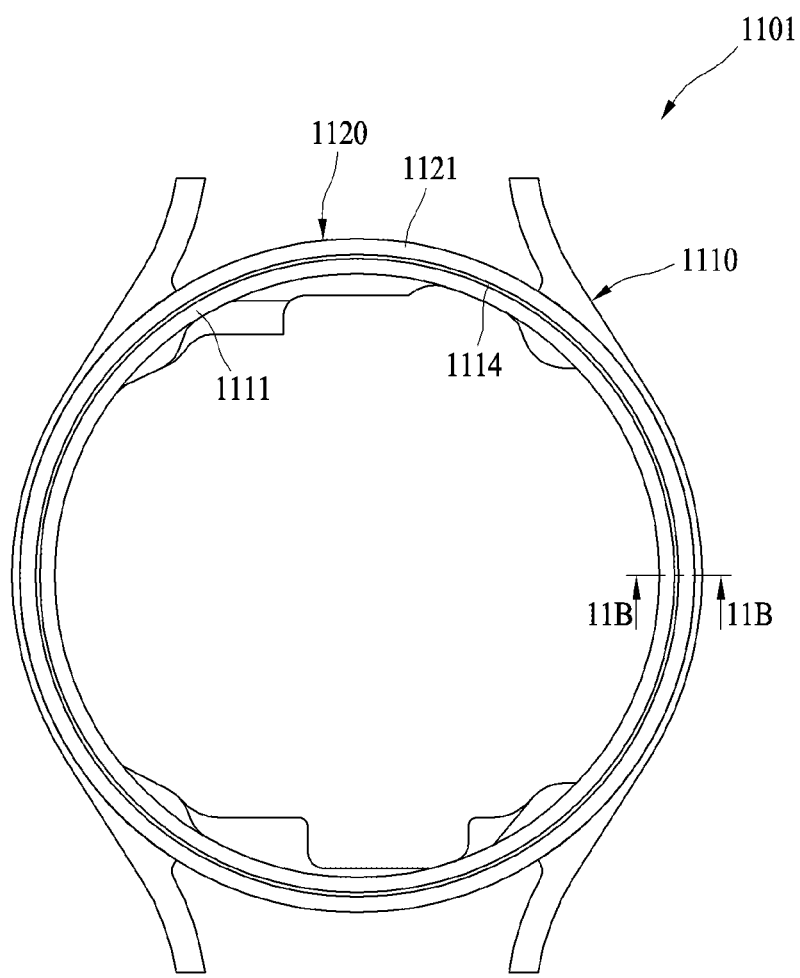
FIG. 11A is a diagram illustrating a coupling structure of a housing and a rim member in a wearable electronic device according to various embodiments.
Figure 11B:
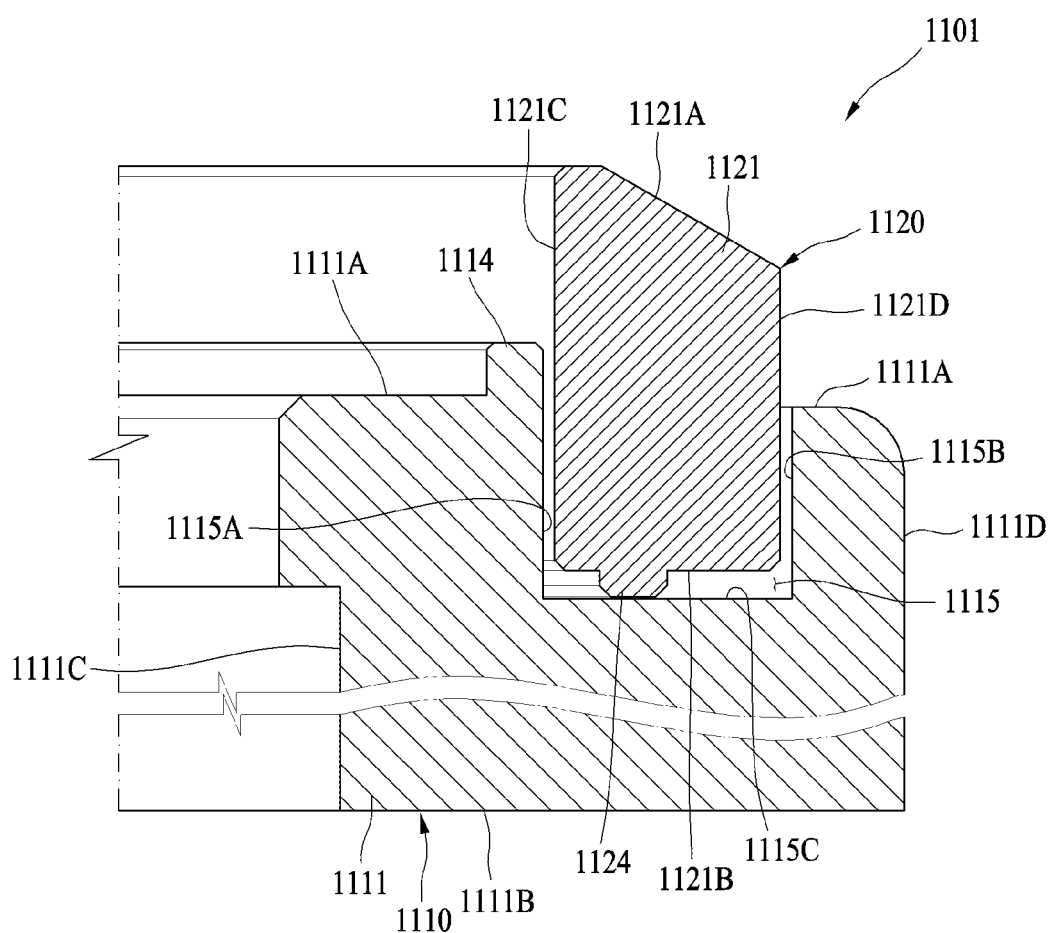
FIG. 11B is a cross-sectional view of a wearable electronic device taken along line 11B-11B of FIG. 11A according to various embodiments.

FIG. 11A is a diagram illustrating a coupling structure of a housing and a rim member in a wearable electronic device according to various embodiments. FIG. 11B is a cross-sectional view of a wearable electronic device taken along line 11B-11B of FIG. 11A according to various embodiments. Referring to FIGS. 11A and 11B, according to an embodiment, an electronic device 1101 (e.g., the electronic device 601 of FIGS. 6A to 6F) may include a housing 1110 (e.g., the housing 610) and a rim member 1120 (e.g., the rim member 620).

The housing 1110 may include a housing body 1111 (e.g., the housing body 611), a first protrusion 1114 (e.g., the first protrusion 614), and a first recess 1115 (e.g., the first recess 615). The housing body 1111 may include a first housing surface 1111A (e.g., the first housing surface 411A), a second housing surface 1111B (e.g., the second housing surface 411B), a third housing surface 1111C (e.g., the third housing surface 411C), and a fourth housing surface 1111D (e.g., the fourth housing surface 411D). The first recess 1115 may include a first recessed surface 1115A (e.g., the first recessed surface 615A), a second recessed surface 1115B (e.g., the second recessed surface 615B), and a third recessed surface 1115C (e.g., the third recessed surface 615C).

The rim member 1120 may include a rim body 1121 (e.g., the rim body 621) and a second protrusion 1124 (e.g., the second protrusion 624). The rim body 1121 may include a first rim surface 1121A (e.g., the first rim surface 621A), a second rim surface 1121B (e.g., the second rim surface 621B), a third rim surface 1121C (e.g., the third rim surface 621C), and a fourth rim surface 1121D (e.g., the fourth rim surface 621D).

In an embodiment, the first protrusion 1114 may be disposed closer to the first recessed surface 1115A and/or the third rim surface 1121C than to the third housing surface 1111C. In various embodiments, the first protrusion 1114 may have a surface that is on substantially the same plane as the first recessed surface 1115A. In an embodiment, no recesses may be formed in the third rim surface 1121C.

Figure 12:
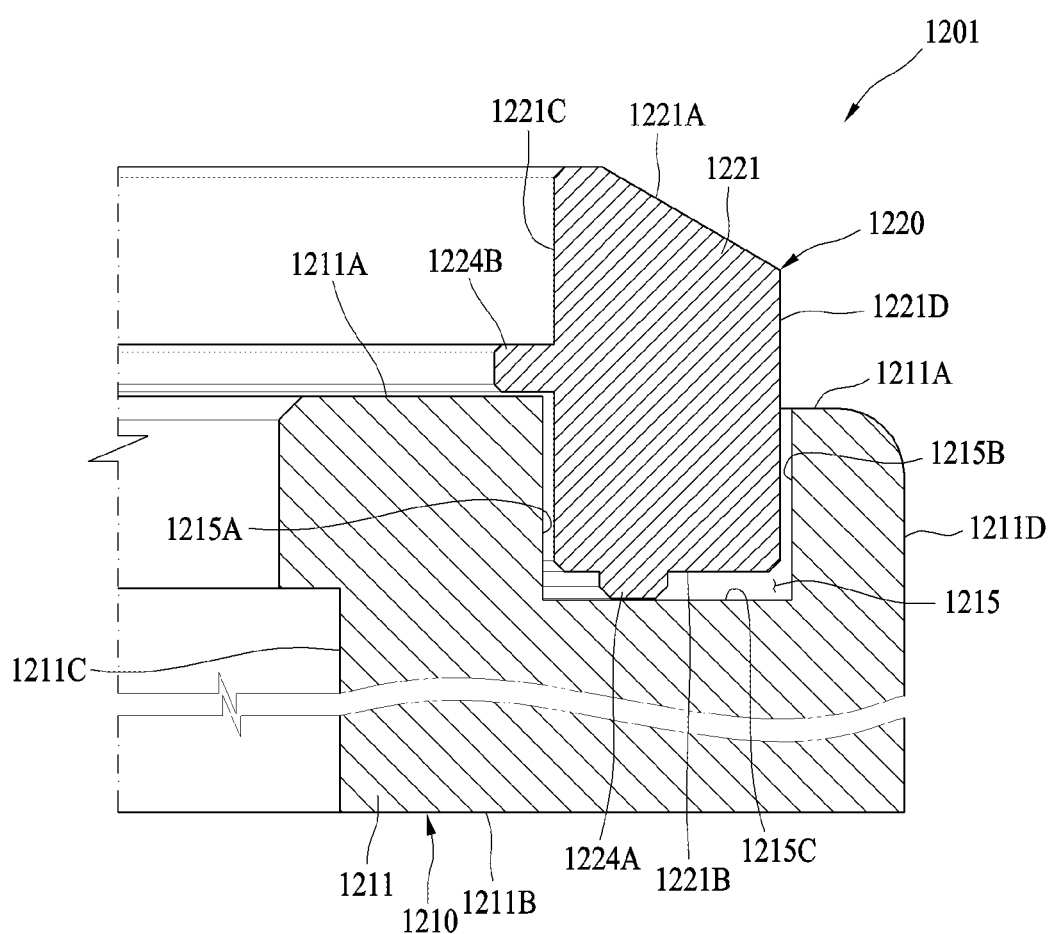
FIG. 12 is a cross-sectional view of a housing and a rim member in a wearable electronic device according to various embodiments.

FIG. 12 is a cross-sectional view of a housing and a rim member in a wearable electronic device according to various embodiments. Referring to FIG. 12, according to an embodiment, an electronic device 1201 (e.g., the electronic device 601 of FIGS. 6A to 6F) may include a housing 1210 (e.g., the housing 610) and a rim member 1220 (e.g., the rim member 620).

The housing 1210 may include a housing body 1211 (e.g., the housing body 611) and a first recess 1215 (e.g., the first recess 615). The housing body 1211 may include a first housing surface 1211A (e.g., the first housing surface 411A), a second housing surface 1211B (e.g., the second housing surface 411B), a third housing surface 1211C (e.g., the third housing surface 411C), and a fourth housing surface 1211D (e.g., the fourth housing surface 411D). The first recess 1215 may include a first recessed surface 1215A (e.g., the first recessed surface 615A), a second recessed surface 1215B (e.g., the second recessed surface 615B), and a third recessed surface 1215C (e.g., the third recessed surface 615C).

The rim member 1220 may include a rim body 1221 (e.g., the rim body 621) and a protrusion 1224A (e.g., the second protrusion 624). The rim body 1221 may include a first rim surface 1221A (e.g., the first rim surface 621A), a second rim surface 1221B (e.g., the second rim surface 621B), a third rim surface 1221C (e.g., the third rim surface 621C), and a fourth rim surface 1221D (e.g., the fourth rim surface 621D).

In an embodiment, the rim member 1220 may include a protrusion 1224B (e.g., the first protrusion 614) disposed on the third rim surface 1221C. The protrusion 1224B may protrude from the third rim surface 1221C between the first housing surface 1211A and the second plate surface (e.g., the second plate surface 630B).

According to various embodiments, a wearable electronic device 601 may include: a housing 610 including a housing body 611, a first protrusion 614, and a first recess 615, wherein the housing body 611 includes a first housing surface 611A, a second housing surface 611B opposite to the first housing surface 611A, a third housing surface 611C disposed between the first housing surface 611A and the second housing surface 611B, and a fourth housing surface 611D opposite to the third housing surface 611C and disposed between the first housing surface 611A and the second housing surface 611B, and the first recess 615 includes a first recessed surface 615A connected to the first housing surface 611A, a second recessed surface 615B connected to the first housing surface 611A and opposite to the first recessed surface 615A, and a third recessed surface 615C between the first recessed surface 615A and the second recessed surface 615B, a rim member 620 including a rim body 621 and a second protrusion 624, wherein the rim body 621 includes a first rim surface 621A, a second rim surface 621B opposite to the first rim surface 621A and facing the third recessed surface 615C, a third rim surface 621C disposed between the first rim surface 621A and the second rim surface 621B and facing the first recessed surface 615A, and a fourth rim surface 621D opposite to the third rim surface 621C and disposed between the first rim surface 621A and the second rim surface 621B and facing the second recessed surface 615B, and the second protrusion 624 protrudes from the second rim surface 621B between the second rim surface 621B and the third recessed surface 615C, a plate 630 disposed over the first protrusion 614, a first adhesive portion 650 disposed between the plate 630 and the first housing surface 611A, and a second adhesive portion 660 disposed between the third recessed surface 615C and the second rim surface 611B.

In an embodiment, the first adhesive portion 650 may include a first adhesive area A11 disposed between the first protrusion 614 and the third rim surface 621C.

In an embodiment, the second adhesive portion 660 may include a second adhesive area A21 between the first recessed surface 615A and the second protrusion 624, and a third adhesive area A22 between the second recessed surface 615B and the second protrusion 624.

In an embodiment, a size of the third adhesive area A22 may be greater than a size of the second adhesive area A21.

In an embodiment, the rim member 620 may further include a second recess 625 formed on the third rim surface 621C.

In an embodiment, the housings 410, 510, and 610 may further include: a first lug surface 513A connected to the second housing surfaces 411B and 611B, a plurality of lugs 413 and 513 including a second lug surface 513B opposite to the first lug surface 513A, and a groove 516 disposed between the fourth housing surfaces 511D and 611D and the second lug surface 513B, and the rim members 420, 520, and 620 may further include cover portions 422 and 522 configured to be connected to the rim bodies 421, 521, and 621 and disposed on the fourth housing surfaces 511D and 611D and be coupled to the groove 516.

In an embodiment, the housing body 711 may further include a first curved portion C1 formed on the third recessed surface 715C, and the rim body 721 may further include a second curved portion C2 formed on the second rim surface 721B.

In an embodiment, the housing bodies 411 and 811 may further include a first hole H1 including an inner side surface 811H-2 tapered and formed between the first housing surface 411A and the second housing surface 411B, and the rim members 420 and 820 may further include cover portions 422 and 822 connected to the rim bodies 421 and 821 and disposed on the second housing surface 411B, wherein the cover portions 422 and 822 may include a second hole H2 configured to be aligned with the first hole H1.

In an embodiment, the first protrusion 1014 may be disposed closer to the first recessed surface 1015A than to the third housing surface 1011C.

In an embodiment, the first housing surface 1011A may include a first area Z1 in which the first protrusion 1014 is formed, and a second area Z2 in which the first protrusion 1014 is not formed.

According to various embodiments, the wearable electronic devices 601 and 1001 may include: a housing 1010 including a housing body 1011, a first protrusion 1014, and a first recess 1015, wherein the housing body 1011 includes a first housing surface 1011A, a second housing surface 1011B opposite to the first housing surface 1011A, a third housing surface 1011C disposed between the first housing surface 1011A and the second housing surface 1011B, and a fourth housing surface 1011D opposite to the third housing surface 1011C and disposed between the first housing surface 1011A and the second housing surface 1011B, and the first protrusion 1014 protrudes from the first housing surface 1011A, wherein the first protrusion 1014 is not formed in a first area Z1 of the first housing surface 1011A but is formed in a second area Z2 different from the first area Z1 of the first housing surface 1011A, and the first recess 1015 includes a first recessed surface 1015A connected to the first housing surface 1011A, a second recessed surface 1015B connected to the first housing surface 1011A and opposite to the first recessed surface 1015A, and a third recessed surface 1015C between the first recessed surface 1015A and the second recessed surface 1015B, a rim member 1020 including a rim body 1021 and a second protrusion 1024, wherein the rim body 1021 includes a first rim surface 1021A, a second rim surface 1021B opposite to the first rim surface 1021A and facing the third recessed surface 1015C, a third rim surface 1021C disposed between the first rim surface 1021A and the second rim surface 1021B and facing the first recessed surface 1015A, and a fourth rim surface 1021D opposite to the third rim surface 1021C and disposed between the first rim surface 1021A and the second rim surface 1021B and facing the second recessed surface 1015B, and the second protrusion 1024 protrudes from the second rim surface 1021B between the second rim surface 1021B and the third recessed surface 1015C, a plate 630 disposed over the first protrusion 1014, a first adhesive portion 650 disposed between the plate 630 and the first housing surface 1011A, and a second adhesive portion 660 disposed between the third recessed surface 1015C and the second rim surface 1021B.

In an embodiment, the housing 1010 may further include a lug 1013 formed on at least a portion of the fourth housing surface 1011D, and the first area Z1 may include an area of the first housing surface 1011A connected to an area of the fourth housing surface 1011D in which the lug 1013 is not formed, and the second area Z2 may include an area of the first housing surface 1011A connected to an area of the fourth housing surface 1011D in which the lug 1013 is formed.

In an embodiment, the first protrusion 1014 may be disposed closer to the first recessed surface 1015A than to the third housing surface 1011C.

In an embodiment, the rim member 1020 may further include a second recess 1025 formed on the third rim surface 1021C.

In an embodiment, the first adhesive portion 650 may include a first adhesive area A11 disposed between the third housing surfaces 611C and 1011C and the first protrusion 1014, and a second adhesive area A12 disposed between the third housing surfaces 611C and 1011C and the third rim surface 1021C.

According to various embodiments, the wearable electronic devices 601 and 1201 may include: a housing 1210 including a housing body 1211 and a first recess 1215, wherein the housing body 1211 includes a first housing surface 1211A, a second housing surface 1211B opposite to the first housing surface 1211A, a third housing surface 1211C disposed between the first housing surface 1211A and the second housing surface 1211B, and a fourth housing surface 1211D opposite to the third housing surface 1211C and disposed between the first housing surface 1211A and the second housing surface 1211B, and the first recess 1215 includes a first recessed surface 1215A connected to the first housing surface 1211A, a second recessed surface 1215B connected to the first housing surface 1211A and opposite to the first recessed surface 1215A, and a third recessed surface 1215C between the first recessed surface 1215A and the second recessed surface 1215B, a rim member 1220 including a rim body 1221, a first protrusion 1224B, and a second protrusion 1224A, wherein the rim body 1221 includes a first rim surface 1211A, a second rim surface 1211B opposite to the first rim surface 1211A and facing the third recessed surface 1215C, a third rim surface 1211C disposed between the first rim surface 1211A and the second rim surface 1211B and facing the first recessed surface 1215A, and a fourth rim surface 1211D opposite to the third rim surface 1211C and disposed between the first rim surface 1211A and the second rim surface 1211B and facing the second recessed surface 1215B, and the first protrusion 1224B protrudes from the third rim surface 1221C, and the second protrusion 1224A protrudes from the second rim surface 1211B between the second rim surface 1211B and the third recessed surface 1215C, a plate 630 disposed over the first protrusion 1224B, a first adhesive portion 650 disposed between the plate 630 and the first housing surfaces 611A and 1211A, and a second adhesive portion 660 disposed between the third recessed surfaces 615C and 1215C and the second rim surfaces 621B and 1221B.

In an embodiment, the first adhesive portion 650 may include a first adhesive area A11 disposed between the first protrusion 1224B and the third housing surfaces 611C and 1211C.

In an embodiment, the second adhesive portion 660 may include a second adhesive area A21 between the first recessed surfaces 615A and 1215A and the second protrusions 624 and 1224A, and a third adhesive area A22 between the second recessed surfaces 615B and 1215B and the second protrusions 624 and 1224A.

In an embodiment, a size of the third adhesive area A22 may be greater than a size of the second adhesive area A21.

In an embodiment, the first protrusion 1224B may be disposed on the first housing surface 1211A.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wearable electronic device, comprising:
    a housing comprising a housing body, a first protrusion, and a first recess, wherein the housing body comprises:
        a first housing surface, a second housing surface opposite to the first housing surface, a third housing surface disposed between the first housing surface and the second housing surface, and a fourth housing surface opposite to the third housing surface and disposed between the first housing surface and the second housing surface, and the first protrusion protruding from the first housing surface in a first direction, and
    the first recess comprises a first recessed surface connected to the first housing surface, a second recessed surface connected to the first housing surface and opposite to the first recessed surface, and a third recessed surface between the first recessed surface and the second recessed surface;
    a rim comprising a rim body and a second protrusion,
        wherein the rim body comprises a first rim surface, a second rim surface opposite to the first rim surface and facing the third recessed surface, a third rim surface disposed between the first rim surface and the second rim surface and facing the first recessed surface, and a fourth rim surface opposite to the third rim surface and disposed between the first rim surface and the second rim surface and facing the second recessed surface, and
        the second protrusion protruding from the second rim surface between the second rim surface and the third recessed surface in a second direction opposite the first direction;
    a plate disposed over the first protrusion;
    a first adhesive portion disposed between the plate and the first housing surface; and
    a second adhesive portion disposed between the third recessed surface and the second rim surface.

2. The wearable electronic device of claim 1, wherein the first adhesive portion comprises a first adhesive area disposed between the first protrusion and the third rim surface.

3. The wearable electronic device of claim 1, wherein the second adhesive portion comprises:
    a second adhesive area between the first recessed surface and the second protrusion; and
    a third adhesive area between the second recessed surface and the second protrusion.

4. The wearable electronic device of claim 3, wherein a size of the third adhesive area is greater than a size of the second adhesive area.

5. The wearable electronic device of claim 1, wherein the rim further comprises a second recess formed on the third rim surface.

6. The wearable electronic device of claim 1, wherein the housing further comprises:
    a plurality of lugs each comprising a first lug surface connected to the second housing surface and a second lug surface opposite to the first lug surface; and
    a groove disposed between the fourth housing surface and the second lug surface, and
    the rim further comprises a cover portion configured to be connected to the rim body, disposed on the fourth housing surface, and coupled to the groove.

7. The wearable electronic device of claim 1, wherein the housing body further comprises a first curved portion formed on the third recessed surface, and the rim body further comprises a second curved portion formed on the second rim surface.

8. The wearable electronic device of claim 1, wherein the housing body further comprises a first hole including an inner side surface formed and tapered between the first housing surface and the second housing surface, and
    the rim further comprises a cover portion connected to the rim body and disposed on the second housing surface, wherein the cover portion comprises a second hole configured to be aligned with the first hole.

9. The wearable electronic device of claim 1, wherein the first protrusion is disposed closer to the first recessed surface than to the third housing surface.

10. The wearable electronic device of claim 1, wherein the first housing surface comprises:
a first area in which the first protrusion is formed; and
a second area in which the first protrusion is not formed.

11. A wearable electronic device, comprising:
a housing comprising a housing body, a first protrusion, and a first recess, wherein the housing body comprises:
a first housing surface, a second housing surface opposite to the first housing surface, a third housing surface disposed between the first housing surface and the second housing surface, and a fourth housing surface opposite to the third housing surface and disposed between the first housing surface and the second housing surface, and
the first protrusion protruding from the first housing surface in a first direction,
wherein the first protrusion is not formed in a first area of the first housing surface and is formed in a second area of the first housing surface different from the first area of the first housing surface, and
the first recess comprises a first recessed surface connected to the first housing surface, a second recessed surface connected to the first housing surface and opposite to the first recessed surface, and a third recessed surface between the first recessed surface and the second recessed surface;
a rim comprising a rim body and a second protrusion,
wherein the rim body comprises: a first rim surface, a second rim surface opposite to the first rim surface and facing the third recessed surface, a third rim surface disposed between the first rim surface and the second rim surface and facing the first recessed surface, and a fourth rim surface opposite to the third rim surface and disposed between the first rim surface and the second rim surface and facing the second recessed surface, and
the second protrusion protruding from the second rim surface between the second rim surface and the third recessed surface in a second direction opposite the first direction;
a plate disposed over the first protrusion;
a first adhesive portion disposed between the plate and the first housing surface; and
a second adhesive portion disposed between the third recessed surface and the second rim surface.

12. The wearable electronic device of claim 11, wherein the housing further comprises a lug formed in an area of at least a portion of the fourth housing surface, and
the first area comprises an area of the first housing surface connected to an area of the fourth housing surface in which the lug is not formed, and the second area comprises an area of the first housing surface connected to an area of the fourth housing surface in which the lug is formed.

13. The wearable electronic device of claim 11, wherein the first protrusion is disposed closer to the first recessed surface than to the third housing surface.

14. The wearable electronic device of claim 11, wherein the rim further comprises a second recess formed on the third rim surface.

15. The wearable electronic device of claim 11, wherein the first adhesive portion comprises:
a first adhesive area disposed between the third housing surface and the first protrusion; and
a second adhesive area disposed between the third housing surface and the third rim surface.

16. A wearable electronic device, comprising:
a housing comprising a housing body and a first recess, wherein the housing body comprises:
a first housing surface, a second housing surface opposite to the first housing surface, a third housing surface disposed between the first housing surface and the second housing surface, and a fourth housing surface opposite to the third housing surface and disposed between the first housing surface and the second housing surface, and
the first recess comprises a first recessed surface connected to the first housing surface, a second recessed surface connected to the first housing surface and opposite to the first recessed surface, and a third recessed surface between the first recessed surface and the second recessed surface;
a rim comprising a rim body, a first protrusion, and a second protrusion,
wherein the rim body comprises: a first rim surface, a second rim surface opposite to the first rim surface and facing the third recessed surface, a third rim surface disposed between the first rim surface and the second rim surface and facing the first recessed surface, and a fourth rim surface opposite to the third rim surface and disposed between the first rim surface and the second rim surface and facing the second recessed surface, and
the first protrusion protruding from the third rim surface, and
the second protrusion protruding from the second rim surface between the second rim surface and the third recessed surface;
a plate disposed over the first protrusion;
a first adhesive portion disposed between the plate and the first housing surface; and
a second adhesive portion disposed between the third recessed surface and the second rim surface, wherein the second adhesive portion comprises:
a second adhesive area between the first recessed surface and the second protrusion; and
a third adhesive area between the second recessed surface and the second protrusion.

17. The wearable electronic device of claim 16, wherein the first adhesive portion comprises a first adhesive area disposed between the first protrusion and the third housing surface.

18. The wearable electronic device of claim 16, wherein a size of the third adhesive area is greater than a size of the second adhesive area.

19. The wearable electronic device of claim 16, wherein the first protrusion is disposed on the first housing surface.

* * * * *